United States Patent
King et al.

(10) Patent No.: US 12,314,813 B2
(45) Date of Patent: May 27, 2025

(54) IMAGE MODULATION METHODS AND DEVICES USING IMAGE FILTERS, IMAGE PARAMETERS, QUALITY SCORES, AND GRAYSCALE CLUSTERS

(71) Applicant: OMRON Corporation, Kyoto (JP)

(72) Inventors: Steven J. King, Newmarket, NH (US); Robert M. Liu, Bellevue, WA (US); James Moore, Cave Creek, AZ (US)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 18/478,824

(22) Filed: Sep. 29, 2023

(65) Prior Publication Data

US 2025/0111183 A1    Apr. 3, 2025

(51) Int. Cl.
| | |
|---|---|
| *G06K 7/14* | (2006.01) |
| *G06T 5/00* | (2024.01) |
| *G06T 5/30* | (2006.01) |
| *G06T 7/00* | (2017.01) |

(52) U.S. Cl.
CPC ........... *G06K 7/146* (2013.01); *G06T 5/00* (2013.01); *G06T 5/30* (2013.01); *G06T 7/0002* (2013.01); *G06T 2207/20036* (2013.01); *G06T 2207/30168* (2013.01)

(58) Field of Classification Search
None
See application file for complete search history.

(56) References Cited

U.S. PATENT DOCUMENTS

2013/0341397 A1    12/2013    Schuler et al.
2016/0379031 A1    12/2016    Fang

FOREIGN PATENT DOCUMENTS

| EP | 2677492 A1 | 12/2013 |
| EP | 2588993 B1 | 1/2020 |

OTHER PUBLICATIONS

Extended European Search Report dated Dec. 10, 2024, issued in corresponding European Patent Application No. 24186367.9.

*Primary Examiner* — Suezu Ellis
(74) *Attorney, Agent, or Firm* — Morgan, Lewis & Bockius LLP

(57) ABSTRACT

An electronic device obtains a first image, including an image area enclosing a barcode, selects an image filter having a filter parameter, and iteratively processes the first image until a quality score satisfies an image modulation condition. A set of filters and associated filter parameters are determined for processing additional barcode images based on at least the image filter and the filter parameter corresponding to the quality score that satisfies the image modulation condition. During each iterative cycle, the image area is processed by the image filter having the filter parameter to generate a plurality of grayscale values, determine the quality score that measures the quality of two grayscale clusters grouping the grayscale values of the image area, determine whether the quality score satisfies the image modulation condition, and adjust the filter parameter of the image filter when the quality score does not satisfy the image modulation condition.

20 Claims, 12 Drawing Sheets

408: 408A and 408B

Original

Optimized

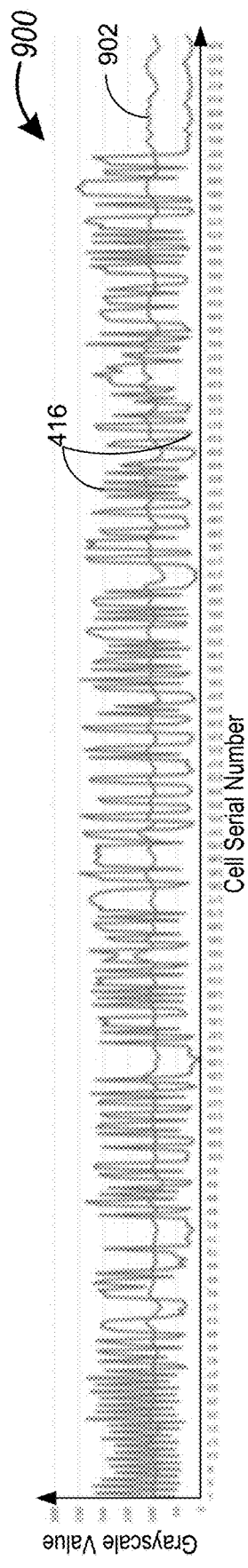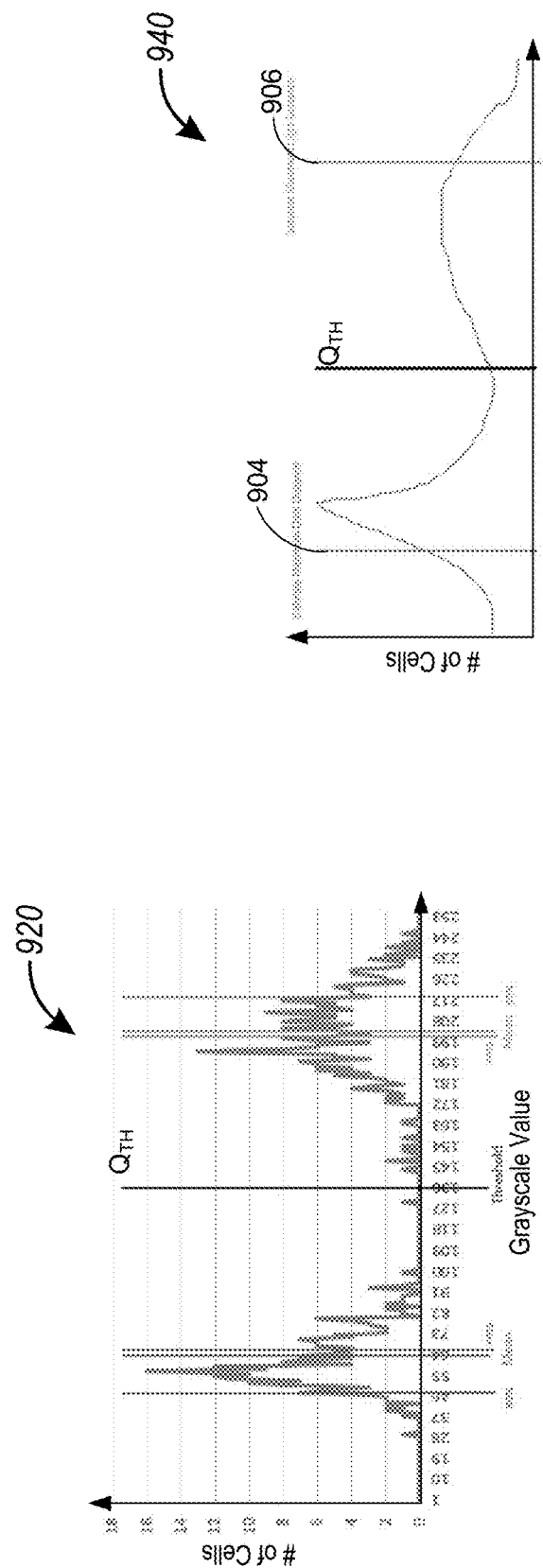

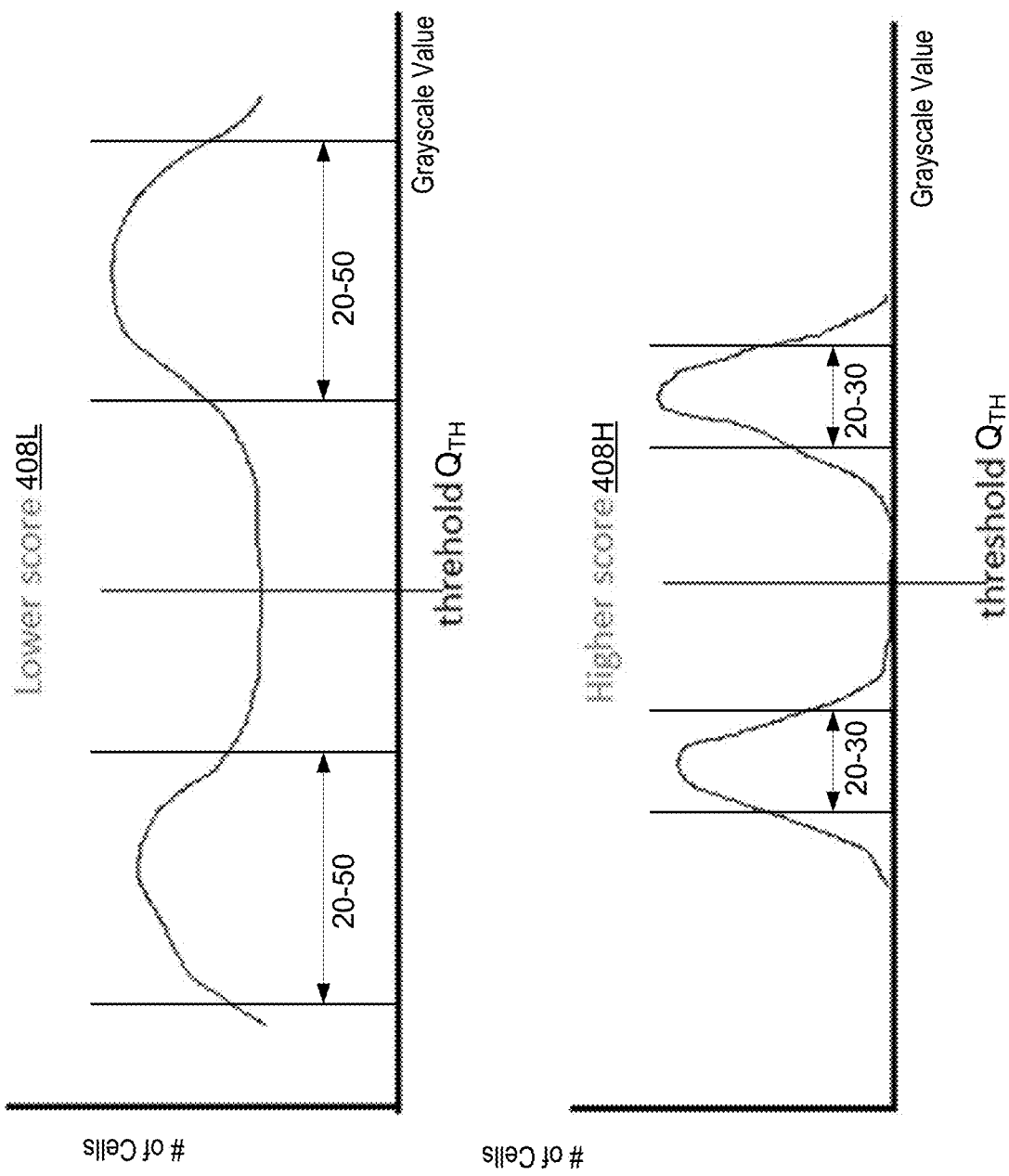

IMAGE MODULATION METHODS AND DEVICES USING IMAGE FILTERS, IMAGE PARAMETERS, QUALITY SCORES, AND GRAYSCALE CLUSTERS

TECHNICAL FIELD

The disclosed embodiments relate generally to electronic circuits and more specifically to systems, devices, and methods for determining and enhancing image processing parameters for processing additional images efficiently in a barcode reader.

BACKGROUND

Barcode readers are widely applied in factories to read both high contrast labels and direct part marks (DPMs) associated with products or product packages. The DPMs are oftentimes marked on parts made of metal or other materials using laser ablation, dot peen marking, engraving, or other permanent marking methods. While many high contrast labels are illuminated with a sufficient contrast for differentiating light and dark areas of the labels, it is difficult to illuminate the DPM to create a sufficiently high contrast to facilitate recognition of the marked and unmarked areas of the DPMs (e.g., corresponding to foreground and background). An imaging system typically angles a code reader, tries various lighting combinations, and receives manual adjustment of various sensor settings and image processing filters until the DPMs are recognized properly. This process is implemented by trial and error with the only feedback being if a code of the DPMs is read or not. Various solutions have emerged to automatically vary imaging parameters systematically for the imaging system to determine a desirable combination of imaging parameters based on a read speed and a read speed variation for recognizing the DPMs. The accuracy of the codes recognized from the DPMs is not monitored or prioritized during automatic imaging parameter adjustment.

SUMMARY

Various embodiments of this application are directed to automatically determining operation conditions of an imaging system that is applied to identify barcodes on objects that appear in the field of view of the imaging system. A sequence of imaging parameters has different combinations of imaging parameters and is applied to control the operation conditions of the imaging system. Examples of the imaging parameters include, but are not limited to, camera settings, image filter types and parameters, lighting conditions, and barcode locations. An image area includes a barcode and has a plurality of grayscale values, which aggregate to form two grayscale clusters as imaging parameters are successively applied. A quality score measuring the quality of the two grayscale clusters is applied to determine whether the sequence of imaging parameters enhances image quality to facilitate recognition of the barcode captured in one or more images. The quality score measures the readability level of the barcode captured in the one or more images, allowing a barcode recognition method to recognize the barcodes in a robust and efficient manner. In some embodiments, the barcode recognition method includes an error correction operation that corrects erroneous bits that are falsely recognized, thereby compensating for some errors caused by low image quality.

In some embodiments, a set of imaging parameters (e.g., filter types and filter parameters) is prioritized over other imaging parameters due to its impact on readability of the barcode. This set is statistically measured in an image modulation process. An image area closely contains the barcode, and has a marked foreground area (e.g., corresponding to dark grid cells in the barcode) and an unmarked background area (e.g., light grid cells in the barcode). The marked foreground area is tightly grouped into a first range of greyscale values, and the unmarked background area is also tightly grouped into a second range of greyscale values. There is a clear threshold that substantially or entirely separates the two groups. As the sequence of imaging parameters is successively applied, the quality score is monitored. The contrast level simply multiplies all greyscale values, and does not separate the grayscale values of the foreground and background areas. The quality score is applied to determine the set of imaging parameters that satisfies an image modulation condition corresponding to a desirable separation between the grayscale values of the foreground and background areas.

In some embodiments, the image area closely enclosing the barcode is defined by, and needs to be accurately identified via, one or more boundaries and one or more corners. A grid pattern is overlapped on the image area to divide the image area to a plurality of grid cells. Each grid cell includes a plurality of image pixels. In some embodiments, the grid pattern is not aligned with the barcode, and many grid cells straddle adjacent grid cells, thereby reducing the quality score associated with the image modulation process. Conversely, in some embodiments, the grid pattern is substantially aligned with the barcode (e.g., having misalignment within a predefined number of image pixels), and the quality score is used to indicate how well the image manipulation process is implemented for creating a desirable modulation of the grid cells of the image area containing the barcode.

Additionally, in some embodiments, a plurality of images of the same barcode is applied to jointly recognize the barcode. Each of the plurality of images is identified to include the barcode, and processed using one or more image filters and their associated filter parameters. As a selection of the one or more image filters and values of the associated filter parameters are adjusted, an average of quality scores associated with the plurality of images is applied to measure two grayscale clusters formed to group the plurality of grayscale values of the image area of each image. In some embodiments, selection of the one or more image filters and adjustment of the associated filter parameters are implemented in the background to determine the associated quality score. Further, in some embodiments, a first image is stored, and then processed for image optimization while a corresponding imaging system is capturing a second image.

In one aspect, an image processing method is implemented at an electronic device. The method includes obtaining a first image of a barcode including an image area enclosing the barcode, selecting a first image filter having at least a first filter parameter, and iteratively processing the first image until a first quality score satisfies an image modulation condition. Processing the first image further includes, during each iterative cycle, processing the image area using at least the first image filter with the first filter parameter to generate a plurality of grayscale values of a processed image area, determining the first quality score that measures a quality of two grayscale clusters formed to group the plurality of grayscale values of the processed image area, determining whether the first quality score satisfies the image modulation condition, and when the first quality score does not satisfy the image modulation condition, adjusting the first filter parameter of the first image filter. The method further includes determining a set of filters and associated filter parameters for processing additional barcode images based on at least the first image filter and the first filter parameter corresponding to the first quality score that satisfies the image modulation condition.

In some embodiments, the method further includes dividing the image area into a plurality of grid cells based on a grid pattern. Each of the plurality of grid cells includes a plurality of image pixels and corresponds to a respective one of the plurality of grayscale values.

In some embodiments, the method further includes obtaining one or more second images of the barcode. Each second image includes a respective image area enclosing the barcode. Each of the first and second images corresponds to a plurality of image settings for capturing the respective image. The method further includes iteratively processing each respective second image of the barcode until a respective second quality score satisfies the image modulation condition. The set of filters and the associated filter parameters are determined for processing the additional barcode image based on image filters and filter parameters corresponding to quality scores, of a first subset of the first and second images, which satisfy the image modulation condition.

In some embodiments, the first image filter includes a subset of a group of morphology filters configured for implementing image operations consisting of: dilation, erosion, opening, closing, gradient, top hat, black hat, and hit-or-miss transform.

In some embodiments, the barcode is a two-dimensional (2D) matrix barcode or a one-dimensional (1D) linear barcode.

In accordance with some embodiments, an electronic device includes one or more processors, memory, and one or more programs stored in the memory. The programs are configured for execution by the one or more processors. The one or more programs include instructions for performing any of the methods described herein.

In accordance with some embodiments, a non-transitory computer-readable storage medium stores one or more programs configured for execution by an electronic device having one or more processors and memory. The one or more programs include instructions for performing any of the methods described herein.

Thus methods, systems, and devices are disclosed that enable optimal design, execution, and performance of barcode scanners.

Note that the various embodiments described above can be combined with any other embodiments described herein. The features and advantages described in the specification are not "all inclusive;" in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the entire inventive subject matter.

BRIEF DESCRIPTION OF THE DRAWINGS

FIG. 9A is an example chart plotting grayscale values in a plurality of grid cells of an image area, in accordance with some embodiments.

FIG. 9B is an example chart of a distribution of grayscale values for a plurality of grid cells of an image area, in accordance with some embodiments.

FIGS. 9C and 9D are example charts of a distribution of grayscale values from which grayscale parameters are extracted, in accordance with some embodiments.

Figure 1:
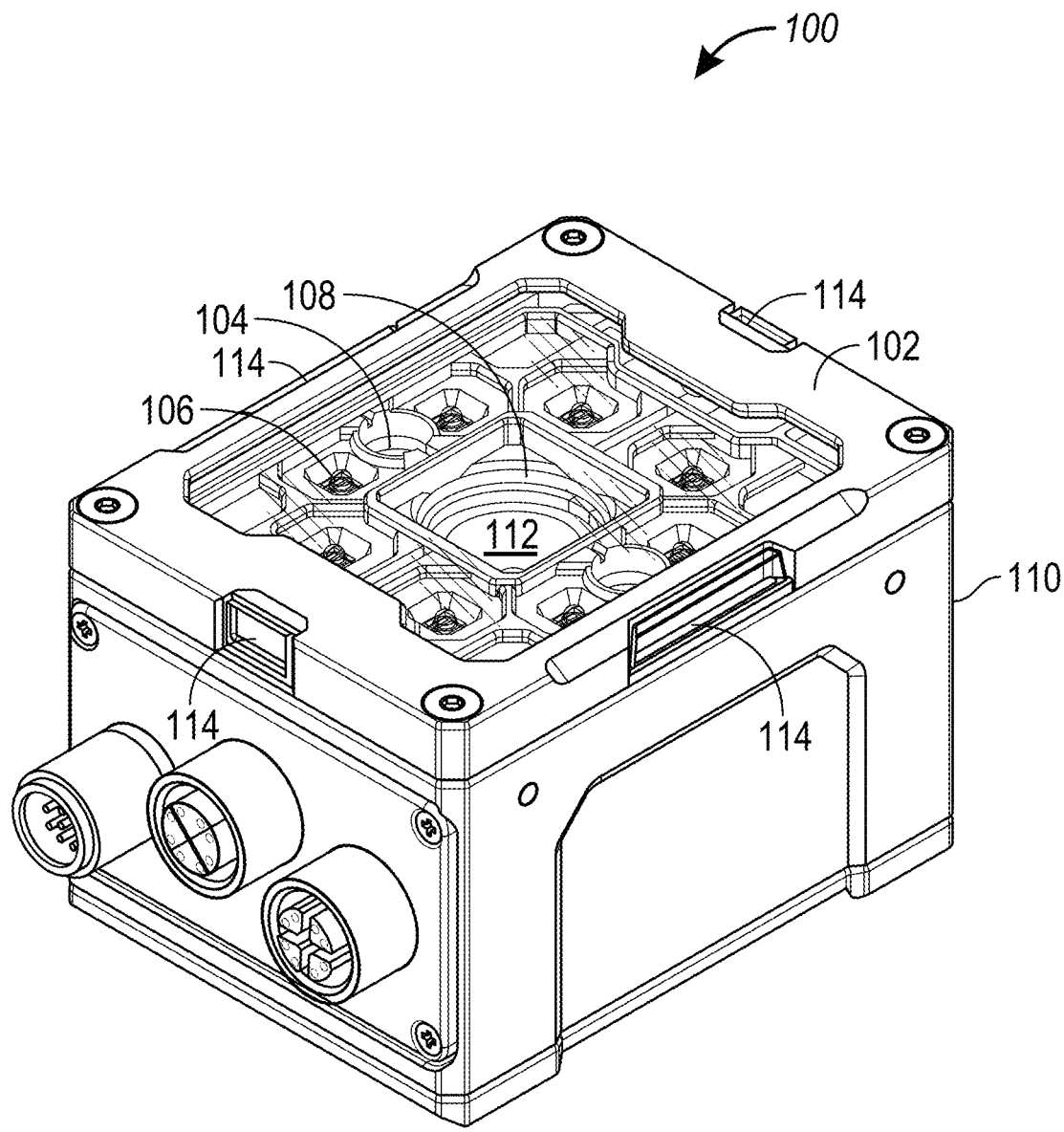
FIG. 1 is a perspective view of an electronic device 100 (e.g., a scanning device), in accordance with some embodiments.

Reference will now be made to embodiments, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF EMBODIMENTS

Various embodiments of this application are directed to automatically determining operation conditions of an imaging system (e.g., a camera) that is applied to identify barcodes on objects that appear in the field of view of the imaging system. A sequence of imaging parameters correspond to different combinations of imaging parameters and is applied to control the operating conditions of the imaging system. Examples of the imaging parameters include, but are not limited to, camera settings, image filter types and parameters, lighting conditions, and barcode locations. An image area includes a barcode and has a plurality of grayscale values, which aggregate to form two grayscale clusters for each associated image as imaging parameters are successively applied. A quality score measuring the quality of the two grayscale clusters is applied to determine whether the sequence of imaging parameters enhances image quality to facilitate recognition of the barcode captured in one or more images. By these means, the quality score determines the readability level of the barcode captured in the one or more images, allowing a barcode recognition method to recognize the barcodes in a robust and efficient manner.

In some embodiments, a set of imaging parameters (e.g., filter types and filter parameters) is prioritized over other imaging parameters due to its impact on readability of the barcode. The set is statistically measured in the image modulation process. An image area closely contains the barcode, and has a marked foreground area (e.g., corresponding to dark grid cells in the barcode) and an unmarked background area (e.g., light grid cells in the barcode). The marked foreground area is tightly grouped into a first range of greyscale values, and the unmarked background area is also tightly grouped into a second range of grey values. There is a clear threshold that substantially or entirely separates the two groups. As the sequence of imaging parameters is successively applied, the quality score is monitored for separation of the two grayscale clusters. The quality score is applied to determine the set of imaging parameters that satisfies an image modulation condition corresponding to a desirable separation between the grayscale values of the foreground and background areas. In some embodiments, the image area closely enclosing the barcode is defined by, and needs to be accurately identified via, a grid pattern having a plurality of grid cells. The grid pattern is substantially aligned with the barcode, and the quality score is used to indicate how well the image manipulation process is implemented for creating a desirable modulation of the grid cells of the image area containing the barcode.

FIG. 1 is a perspective view of an electronic device 100 (e.g., a scanning device), in accordance with some embodiments. In some embodiments, the electronic device 100 is also referred to as a code reader, a barcode scanner, a label scanner, an optical scanner, or an image capturing system. In some embodiments, the electronic device 100 is part of an optical data reading system (e.g., a label scanning station). The electronic device 100 includes a housing 110 (e.g., a body or an exterior case) for protecting components that are located inside the electronic device 100. In some embodiments, the housing 110 includes integrated fittings or brackets to keep the internal components in place. In some embodiments, the electronic device 100 includes a top cover 102 positioned on the top side of the electronic device 100. In some embodiments, the top cover 102 is transparent or partially transparent.

In some embodiments, the electronic device 100 includes one or more distance sensors 104 (e.g., internal distance sensors), which are positioned within the electronic device 100. For example, referring to FIG. 1, a distance sensor 104 is positioned inside the electronic device 100 (e.g., adjacent to the top cover 102), and faces the front end of the electronic device 100. In some embodiments, the distance sensor 104 is included in a targeting module. The distance sensor 104 projects a beam of light at a target to aid in visual alignment of the target when the target is disposed on the electronic device 100. This helps align the camera to a center point of an imaging plane or a field of view. In some embodiments, each distance sensor 104 is a time-of-flight (TOF) sensor, an ultrasonic sensor, a radar sensor, a light detection and ranging (LiDAR) sensor, or an infrared (IR) distance sensor. In some embodiments, the electronic device 100 includes two or more distance sensors 104, each having the same type (e.g., each of the two or more distance sensors is a TOF sensor). In some embodiments, the electronic device 100 includes two or more distance sensors, at least two of which are of distinct types (e.g., the electronic device 100 includes a TOF distance sensor and a radar sensor). In some embodiments, the electronic device 100 includes one or more proximity sensors for sensing (e.g., detecting) if an object is within the sensing area where the proximity sensor is designed to operate. In some embodiments, the electronic device 100 uses distance measuring techniques, such as an image focus finder, an analog-to-digital conversion (ADC) circuit, and/or a digital-to-analog conversion (DAC) circuit, to determine the distance between a target object and the electronic device 100.

More specifically, in some embodiments, the distance sensor 104 is a TOF sensor. A TOF sensor measures the elapsed time from the emission of a signal (e.g., a wave pulse, an LED pulse, a laser pulse, or IR waves) from the sensor to the moment it returns to the sensor after reflecting off of an object. Distance is then calculated by using the speed of light in air and the time between sending/receiving the signal. In some embodiments, the distance sensor 104 is an ultrasonic sensor. An ultrasonic sensor, or a Sonar sensor, detects the distance to an object by emitting high-frequency sound waves. The ultrasonic sensor emits high-frequency sound waves towards a target object, and a timer is started. The target object reflects the sound waves back towards the sensor. A receiver picks up the reflected wave and stops the timer. The time taken for the wave's return is calculated against the speed of sound to determine the distance travelled. In some embodiments, the distance sensor 104 is a radar sensor. The radar sensor (e.g., a radar distance sensor) transmits high frequency radio waves (e.g., microwaves) and calculates the distance to an object by measuring the reflection of the radio waves from the object. In some embodiments, the radar sensor is configured to determine the distance, the angle, and the radial velocity of an object relative to the location of the electronic device 100. In some embodiments, the distance sensor 104 is a LiDAR sensor, which measures the range of a target object through light waves from a laser (e.g., instead of radio or sound waves). In some embodiments, the distance sensor 104 is an infrared (IR) distance sensor. An IR distance sensor works through the principle of triangulation, measuring distance based on the angle of the reflected beam.

In some embodiments, the electronic device 100 further includes a plurality of light sources 106 (e.g., 8 light emitting diodes (LEDs) in FIG. 1) mounted on a printed circuit board (PCB) 108. A light source 106 is also called a lighting source, an illumination source, or an illuminator. In some embodiments, the light sources 106 are part of an illumination system of the electronic device 100, which also includes illuminators (e.g., bright field and dark field illuminators), a reflector, and a lighting module. More details on the illumination system are described in U.S. patent application Ser. No. 14/298,659, filed Jun. 6, 2014, entitled "Combination Dark Field and Bright Field Illuminator," now U.S. Pat. No. 8,989,569, issued on Mar. 24, 2015, which is incorporated by reference herein in its entirety.

In some embodiments, the light sources 106 have one or more lighting types. Examples of the lighting types include, but are not limited to, LED light sources, laser light sources, and liquid crystal display (LCD) lights. Each of the lighting types has respective lighting characteristics, such as color (e.g., blue, red, or green) and/or intensity. The light sources 106 are mounted on (e.g., soldered on) the PCB 108, which is positioned within the electronic device 100 (e.g., behind the top cover 102). The PCB 108 includes a front surface facing the top cover 102 of the electronic device 100. In some embodiments, the light sources mounted on the front surface of the PCB 108 includes both long range light sources and low angle light sources.

In some embodiments, the electronic device 100 includes a camera 112. A lens of the camera 112 is exposed via an opening of the PCB 108 and physically surrounded by the light sources 106. The light sources 106 are grouped into a plurality of illumination units (e.g., a first illumination unit and a second illumination unit). Each illumination unit is configured to be independently controlled to illuminate a distinct region of the field of view of the camera 112. In an example, every two light sources 106 near a corner of the top cover 102 are grouped to form an illumination unit. Four illumination units are independently controlled to illuminate respective regions of a field of view of the camera 112 in a sequential or concurrent manner.

In some embodiments, the electronic device 100 further includes one or more indicators 114. Each indicator 114 is located at an edge of the top cover 102 of the electronic device 100, and configured to be illuminated according to a light pattern in which a single color or different colors are displayed for a sequence of temporal durations defined based on the frequency. In some situations, the light pattern represents a message including data or status of the electronic device 100. For example, the indicators 114 are illuminated with a red color continuously in response to detection of the presence of a product on or near the top cover, and turn to a green color and stay in green for a shortened duration of time in response to a successful scan of a barcode displayed on the product. In some embodiments, each indicator 114 includes one or more LEDs from which light is emitted, and the light is displayed on the indicator 114 in a substantially uniform and homogeneous manner.

Figure 2:
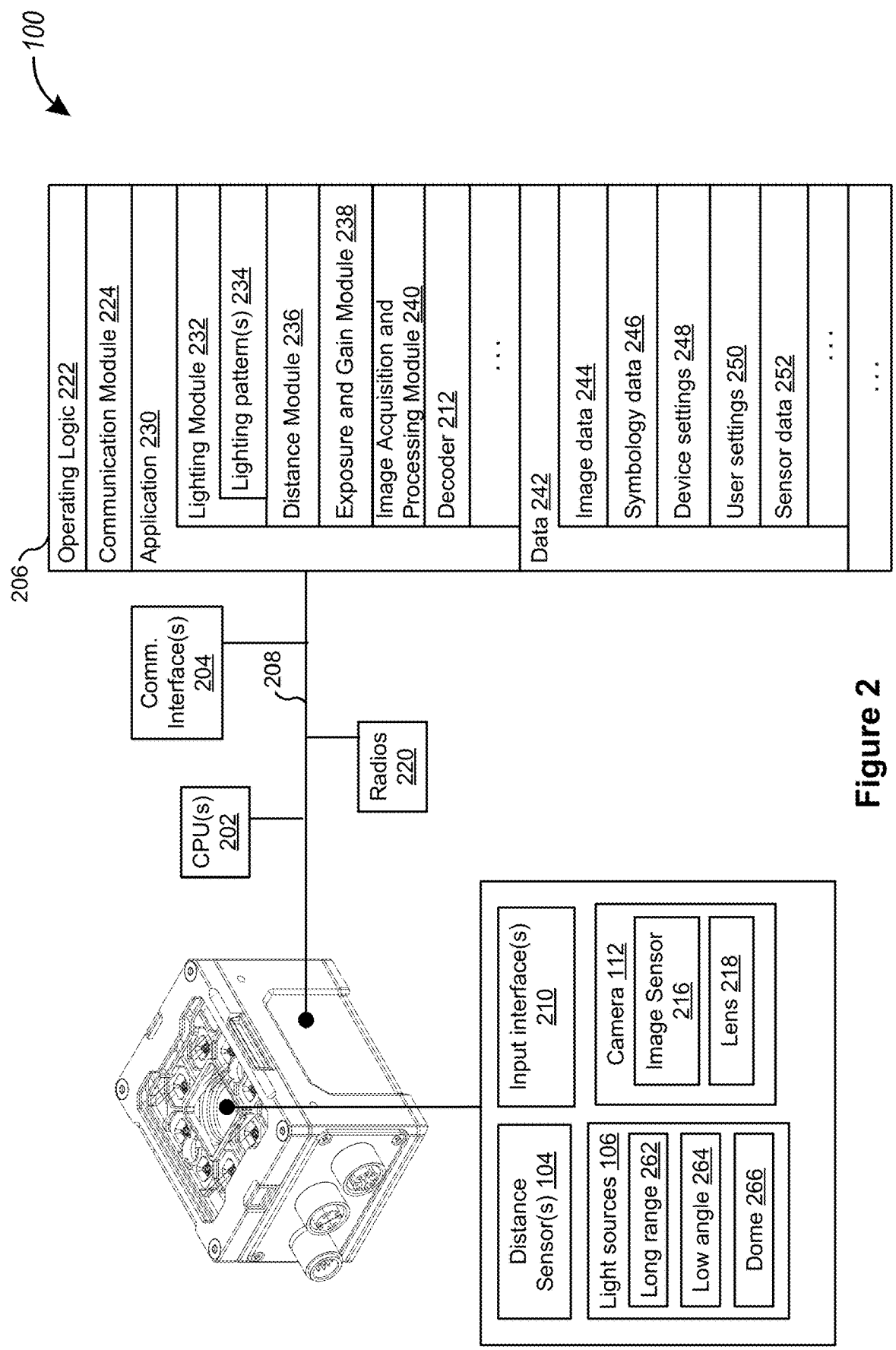
FIG. 2 is a block diagram of an example electronic device 100, in accordance with some embodiments.

FIG. 2 is a block diagram of an example electronic device 100, in accordance with some embodiments. The electronic device 100 includes one or more distance sensors 104, as described previously with respect to FIG. 1. In some embodiments, the one or more distance sensors 104 include one or more of: a time-of-flight sensor, an ultrasonic sensor, a radar sensor, or a LiDAR sensor. In some embodiments, the electronic device 100 includes one or more proximity sensors for sensing (e.g., detecting) if an object is within the sensing area where the proximity sensor is designed to operate. In some embodiments, the electronic device 100 uses distance measuring techniques, such as an image focus finder, analog-to-digital conversion (ADC), and/or digital-to-analog conversion (DAC), to determine the distance between a target object and the electronic device 100.

The electronic device 100 includes light sources 106. In some embodiments, the light sources 106 include a long range light source 262, a low angle light source 264, and/or a dome light source 266, as described in FIG. 3 and in U.S. patent application Ser. No. 14/298,659, filed Jun. 6, 2014, entitled "Combination Dark Field and Bright Field Illuminator," now U.S. Pat. No. 8,989,569, which issued on Mar. 24, 2015 and is incorporated by reference herein in its entirety. In some embodiments, the light sources 106 provide illumination in visible light. In some embodiments, the light sources 106 provide illumination in invisible light (e.g., in infrared light or violet light).

In some embodiments, the electronic device 100 includes a decoder 212 for decoding data contained in a barcode and sending the data to a computer device. In some embodiments, the decoder 212 is part of a software application 230. Details of the decoder 212 are described in U.S. patent application Ser. No. 14/298,659, filed Jun. 6, 2014, entitled "Combination Dark Field and Bright Field Illuminator," now U.S. Pat. No. 8,989,569, which issued on Mar. 24, 2015 and is incorporated by reference herein in its entirety.

In some embodiments, the electronic device 100 includes one or more input interfaces 210 for facilitating user input. In some embodiments, the electronic device 100 is a battery-operated device and includes a rechargeable battery. In this instance, the input interface 210 can include a charging port for charging the battery.

In some embodiments, the electronic device 100 includes a camera 112, which includes an image sensor 216 and a lens 218. The lens 218 directs the path of light rays and concentrates them onto the image sensor 216, to re-create the image as accurately as possible on the image sensor. The image sensor 216 converts light (e.g., photons) into electrical signals that can be interpreted by the electronic device 100. In some embodiments, the lens 218 is an optical lens and is made from glass or other transparent material. In some embodiments, the lens 218 is a liquid lens that is composed of an optical liquid material, and whose shape, focal length, and/or working distance varies when a current or voltage is applied to the liquid lens. In some embodiments, the electronic device 100 (e.g., via the processor(s) 202) uses distance information obtained by the distance sensor 104, to determine the optimal current or voltage to apply to the liquid lens 218 so as to have the optimal focal length for decoding the barcode data contained in an image. In some embodiments, the camera 112 is configured to capture images in color. In some embodiments, the camera 112 is configured to capture images in black and white.

The electronic device 100 also includes one or more processors (e.g., CPU(s)) 202, one or more communication interface(s) 204 (e.g., network interface(s)), memory 206, and one or more communication buses 208 for interconnecting these components (sometimes called a chipset).

In some embodiments, the electronic device 100 includes radios 220. The radios 220 enable one or more communication networks, and allow the electronic device 100 to communicate with other devices, such as a computer device or a server. In some embodiments, the radios 220 are capable of data communication using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, Ultrawide Band (UWB), and/or software defined radio (SDR)), custom or standard wired protocols (e.g., Ethernet or HomePlug), and/or any other suitable communication protocol, including communication protocols not yet developed as of the filing date of this patent application.

The memory 206 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 206 includes one or more storage devices remotely located from one or more processor(s) 202. The memory 206, or alternatively the non-volatile memory within the memory 206, includes a non-transitory computer-readable storage medium. In some embodiments, the memory 206, or the non-transitory computer-readable storage medium of the memory 206, stores the following programs, modules, and data structures, or a subset or superset thereof:

operating logic 222, including procedures for handling various basic system services and for performing hardware dependent tasks;

a communication module 224 (e.g., a radio communication module), which connects to and communicates with other network devices (e.g., a local network, such as a router that provides Internet connectivity, networked storage devices, network routing devices, server systems, computing devices, and/or other connected devices) coupled to one or more communication networks via the communication interface(s) 204 (e.g., wired or wireless);

an application 230, which acquires images that contain labels (e.g., barcodes) and decodes the labels, and controls one or more components of the electronic device 100 and/or other connected devices in accordance with the determined state. In some embodiments, the application 230 includes:

a lighting module 232, which selects and deploys (e.g., based on distance measurements, such as direct measurements from the distance sensor(s) 104 or indirect measurements) one or more light sources 106 and/or sequences of lighting patterns 234 for a current read cycle;

a distance module 236, which determines (e.g., selects) which sequence of focus distances to be employed during the current read cycle, based on distance measurements from the distance sensor(s) 104;

an exposure and gain module 238, which samples images 244 captured by the camera 112;

an image acquisition and processing module 240, which acquires and processes images, e.g., in accordance with a process illustrated in one of FIGS. 4-6 and 8; and a decoder 212 for decoding data contained in a barcode and sending the data to a computer device;

data 242 for the electronic device 100, including but not limited to:

image data 244 (e.g., camera data);

symbology data 246 (e.g., types of codes, such as bar codes);

device settings 248 for the electronic device 100, such as default options, image acquisition settings (e.g., exposure and gain settings), and preferred user settings; and user settings 250, such as a preferred shade for the lenses (e.g., for photochromic lenses); and sensor data 252 that is acquired (e.g., measured) from the distance sensor(s) 104 and/or other sensors that are included in the electronic device 100.

In some embodiments, the distance sensor 104 is monitored by the lighting module 232. When the user commences a current read cycle, the distance sensor 104 identifies a distance field (e.g., near field, medium field, or far field) corresponding to the location of the target object. The lighting module 232 selects a lighting sequence, corresponding to the distance field, for execution. If a good read was achieved in a previous read cycle (e.g., a good read from the third lighting pattern of the near field lighting sequence), and the current read cycle has the same distance field as the previous read cycle, the application 230 will commence the current read cycle by using values of the earlier good read (e.g., the third lighting pattern of the near field lighting pattern, the previous focus position, the exposure, and/or the gain), before starting the lighting sequence from the beginning. Users are typically reading many similar parts, and the apparatus can achieve a good read sooner if it starts with known good settings from the last decode operation. If no previous settings lead to a good read, then the lighting sequence for the current distance field starts at the beginning and iterates through each sequence capture-after-capture.

In some embodiments, the exposure and gain module 238 rejects images that do not fall within predefined attribute ranges for "brightness" and/or "sharpness" (e.g., the rejected images are not processed by the image acquisition and processing module 240). In some embodiments, the exposure and gain module 238 updates image acquisition settings (such as exposure and gain) for the next coming image capture in order to provide the optimal "brightness" for image processing.

In some embodiments, after an image is captured (e.g., using the camera 112), the electronic device 100 (e.g., via the application 230) evaluates the quality of an acquired image. For example, the electronic device 100 reads (e.g., determines) a sharpness value, an average light mean value, and/or an average dark mean value of the image, to determine whether to qualify or reject the image. If the results do not meet or exceed predefined target values, the image is rejected and another image is recaptured. If the results meet or exceed the predefined target values, the image is processed (e.g., by the image acquisition and processing module 240).

As an example, in some embodiments, a good quality image is an image sample that has a light mean score between 100-170 (out of the range of 0 to 255), a dark mean score between 20-80 (out of the range of 0 to 255), and a sharpness score above 6000 (out of the range from 0 to about 12,000).

In some embodiments, data collected during the image sampling (e.g., evaluation) is captured and added (e.g., as data 242).

In some embodiments, after qualifying the image, the electronic device 100 (e.g., via the application 230) determines whether to adjust the exposure or gain setting (e.g., using a light mean correction path or a dark mean correction path) for the next image. Should it decide to do so, the electronic device 100 gathers the target light mean and dark mean values for comparison, deploys a Proportional and Integral (PI) Controller transfer function, and computes necessary changes to exposure in order to obtain an ideal exposure in the next image.

In some embodiments, upon successful decode of an image, the exposure, gain, and focus values are fed back to the application 230. On the following read cycle, the application 230 checks if these decode settings are pending. If they are, the electronic device 100 attempts to load camera settings and any previous settings, as opposed to calculating the next configuration of settings. Should the previous decode settings be used, the application 230 samples the image for data but does not adjust the feedback controller's values.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various embodiments. In some embodiments, the memory 206 stores a subset of the modules and data structures identified above. Furthermore, the memory 206 may store additional modules or data structures not described above. In some embodiments, a subset of the programs, modules, and/or data stored in the memory 206 are stored on and/or executed by a server system, and/or by an external device (e.g., a computing device).

Figure 3:
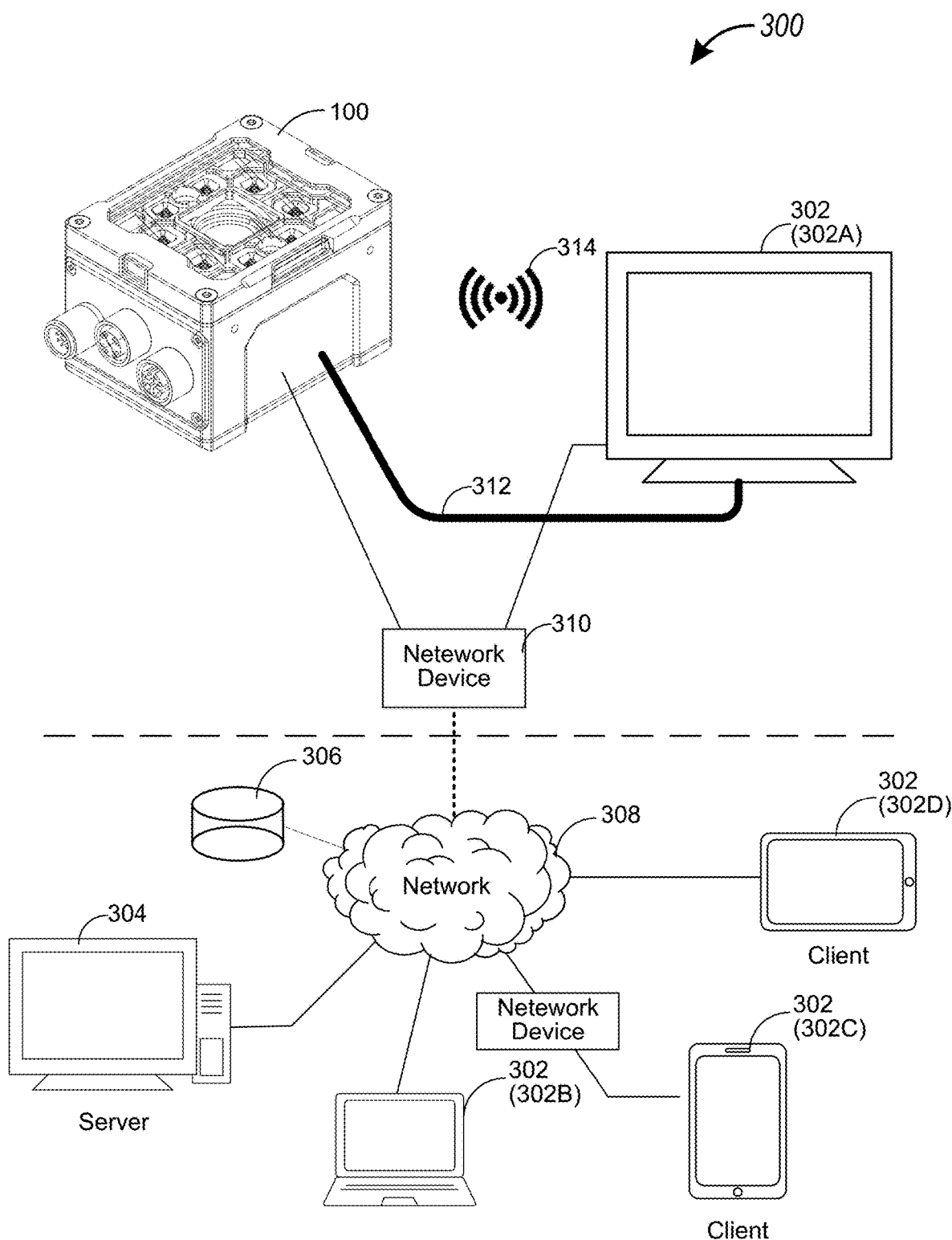
FIG. 3 is an example image processing environment 300 including an electronic device 100 that processes image data using parallel pipelines, in accordance with some embodiments.

FIG. 3 is an example image processing environment 300 including an electronic device 100 that processes images data using parallel pipelines, in accordance with some embodiments. In some embodiments, the electronic device 100 is an imaging device. In some embodiments, the electronic device 100 is a code reader, a barcode scanner, a label scanner, or an optical scanner. In some embodiments, the electronic device 100 is part of an optical data reading system (e.g., a label scanning station). In some embodiments, the electronic device 100 is configured to obtain image data including one or more images, process the image data using the parallel pipelines, and provide report data generated from the image data to one or more client devices 302 (e.g., devices 302A, 302B, 302C, or 302D). The one or more client devices 302 may be, for example, desktop computers, tablet computers, mobile phones, or intelligent, multi-sensing, network-connected home devices (e.g., a display assistant device). Each client device 302 can collect the report data from the electronic device 100, receive user inputs, execute user applications, and present the report data or other information on its user interface. In some embodiments, a user application includes an interactive user application. A user interface of the interactive user application is displayed on the client device to receive the user inputs associated with the electronic device 100 and visualize the report data generated by the electronic device 100.

The electronic device 100 is configured to enable a plurality of parallel pipelines. The electronic device 100 identifies a plurality of image processing cycles associated with a temporal sequence of triggers, and each image processing cycle is created in response to one or more respective trigger events (e.g., one or more image capturing operations). The plurality of image processing cycles is assigned to a plurality of parallel pipelines. A pre-existing cycle data container is directly pulled from a cycle data pool for each parallel pipeline. The electronic device processes the plurality of image processing cycles in the plurality of parallel pipelines to generate respective report data independently of one another. In some embodiments, the temporal sequence of triggers correspond to an ordered sequence of images that is processed during the image processing cycles. The report data of the image processing cycles is generated separately from the plurality of parallel pipelines, independently of the order of the sequence of images. In some situations, the report data of the image processing cycles is organized and provided to the client device 302 according to the order of the corresponding sequence of images.

In some embodiments, the user application implemented on the client device 302 is driven by a first programming language, and the plurality of image processing cycles are executed on the electronic device 100 by a second programming language distinct from the first programming language. The plurality of image processing cycles is configured to exchange instructions and data with the user application automatically via an intermediate data representation between the first and second programming languages. In some embodiments, the intermediate data representation is implemented in JSON (JavaScript Object Notation). The user application includes a web-based user interface, and the first programming language includes JavaScript. A runtime associated with the image processing cycles uses the second language (e.g., C++). JSON is a native format for the runtime by building JSON support into nearly every runtime C++ object, thereby allowing the JavaScript program to understand a workflow format or a report format that is used by the runtime automatically.

In some embodiments, the report data or user inputs are processed locally at the client device 302 and/or remotely by one or more servers 304. The one or more servers 304 provide system data (e.g., boot files, operating system images, and user applications) to the client devices 302, and in some embodiments, process the report data and user inputs received from the client devices 302 when the user application is executed on the client devices 302. In some embodiments, the data processing environment 300 further includes a storage device 306 for storing data related to the servers 304, the client devices 302, the electronic device 100, and user applications executed on the client devices 302. For example, the storage device 306 may store video content, static visual content, and a product database.

The one or more servers 304, the one or more client devices 302, the electronic device 100, and the storage device 306 are communicatively coupled to each other via one or more communication networks 308, which are the medium used to provide communications links between these devices and computers connected together within the data processing environment 300. The one or more communication networks 308 may include connections, such as wire, wireless communication links, or fiber optic cables. Examples of the one or more communication networks 308 include local area networks (LAN), wide area networks (WAN) such as the Internet, or a combination thereof. In some embodiments, the one or more communication networks 308 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol. A connection to the one or more communication networks 308 may be established either directly (e.g., using 3G/4G connectivity to a wireless carrier), or through a network interface 310 (e.g., a router, a switch, a gateway, a hub, or an intelligent, dedicated whole-home control node), or through any combination thereof. As such, the one or more communication networks 308 can represent the Internet of a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other electronic systems that route data and messages.

In some embodiments, the electronic device 100 is communicatively coupled to the client device 302 (302A) via a wired communication link 312. In some embodiments, the electronic device 100 is communicatively coupled to the client device 302 (302A) via a local communication network 314 enabled by the network interface 310. In some embodiments, both the electronic device 100 and client device 302 (e.g., 302A) are located in the same venue (e.g., a warehouse or a factory). In some embodiments, the electronic device 100 is remote from the client devices 302, and communicatively coupled to the client device 302 (e.g., devices 302B, 302C, and/or 302D) via at least a WAN.

Figure 4A:
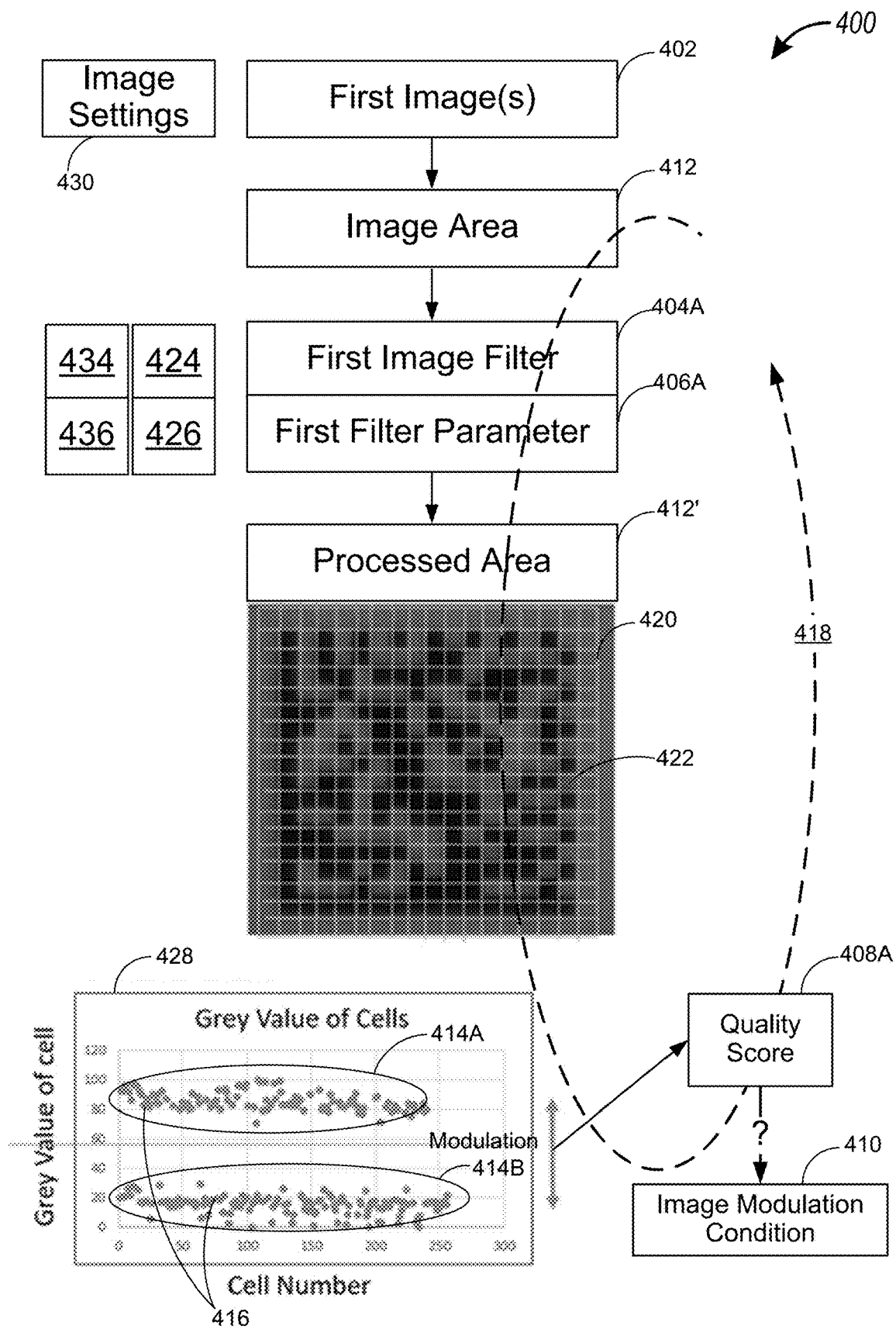
FIG. 4A is a flow diagram of an example image modulation process for processing a first image iteratively, in accordance with some embodiments.
Figure 4B:
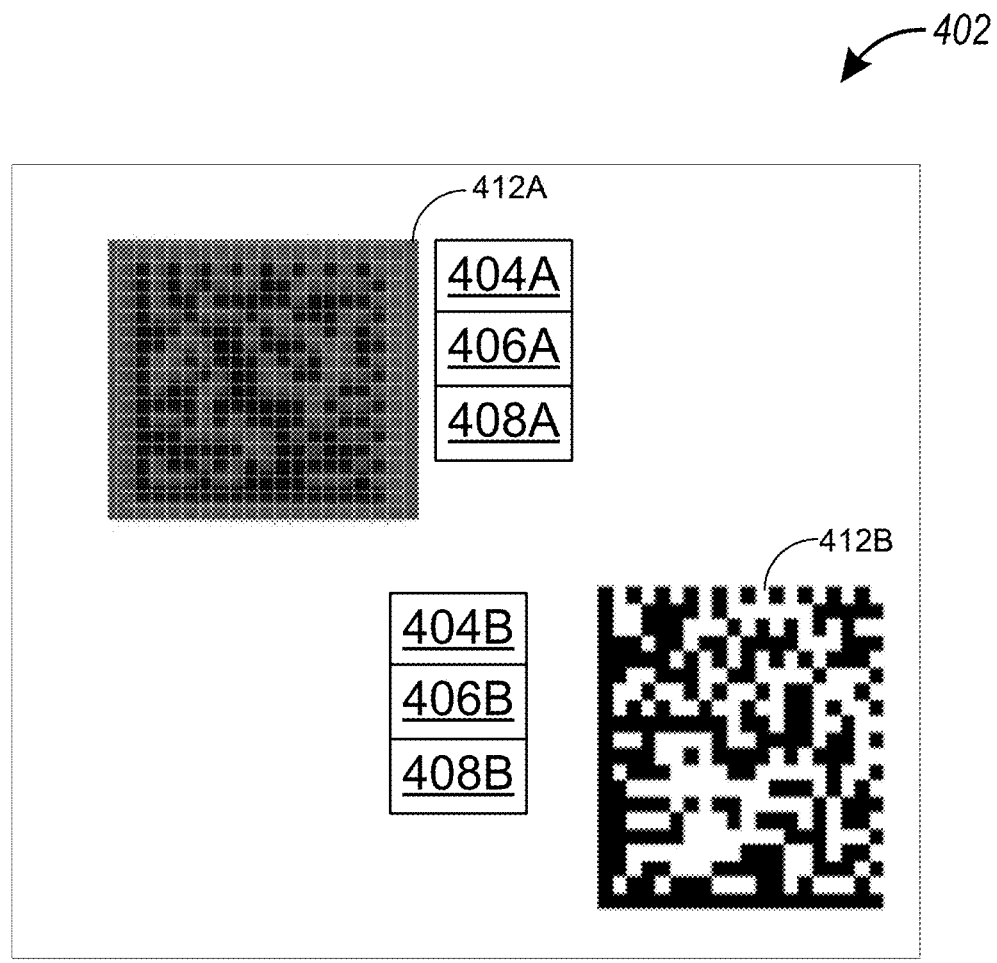
FIGS. 4B illustrates an image having two barcodes, in accordance with some embodiments.

FIG. 4A is a flow diagram of an example image modulation process 400 for processing a first image 402 iteratively, in accordance with some embodiments. FIGS. 4B illustrates an image 402 having two barcodes, in accordance with some embodiments. The process 400 is applied to select a first image filter 404A having a first filter parameter 406A to process the first image 402 and generate a first quality factor 408A that satisfies the image modulation condition 410. The first image 402 includes an image area 412 closely enclosing a barcode, and the barcode is a machine-readable optical image that contains information specific to an object associated with the barcode. The first quality score 408A measures the quality of two grayscale clusters 414A and 414B formed to group grayscale values 416 of a processed image area 412', which is generated from the image area 412 using the first image filter 404A having the first filter parameter 406A. The first image filter 404A and first filter parameter 406A, which correspond to the first quality score 408A satisfying the image modulation condition 410, are applied to determine a set of filters and associated filter parameters for processing additional barcode images. In some embodiments, the barcode is a two-dimensional (2D) matrix barcode or a one-dimensional (1D) linear barcode. An example of a 2D matrix barcode is a quick-response (QR) code. Another example is a Data Matrix code, which encodes data in black and white, or contrasting dark and light, cells arranged in a grid.

In some embodiments, an electronic device obtains the first image 402 of the barcode, which includes the image area 412 enclosing the barcode. The first image filter 404A has at least the first filter parameter 406A and is selected to process the first image 402. The first image 402 is iteratively processed until the first quality score 408A satisfies the image modulation condition 410. During each iterative cycle 418, the electronic system processes the image area 412 using at least the first image filter 404A with the first filter parameter 406A to generate the plurality of grayscale values 416 of the processed image area 412'. The electronic system determines whether the first quality score 408A satisfies the image modulation condition 410. When the first quality score 408A does not satisfy the image modulation condition 410, the first filter parameter 406A of the first image filter 404A is adjusted for a subsequent iterative cycle. Conversely, when the first quality score 408A satisfies the image modulation condition 410, the first filter parameter 406A of the first image filter 404A is applied to determine the set of filters and associated filter parameters for processing additional barcode images.

In some embodiments, the image area 412 is divided into a plurality of grid cells based on a grid pattern 420. Each of the plurality of grid cells 422 includes a plurality of image pixels (e.g., an array of 5×5 pixels) and corresponds to a respective one of the plurality of grayscale values 416. Further, in some embodiments, the electronic system determines the respective grayscale value 416 of each grid cell 422 as an average of grayscale values of the plurality of image pixels.

In some embodiments, the electronic system selects one or more additional image filters 424 each of which has at least one additional filter parameter 426. The first image filter 404A and the one or more additional filters 424 are fixed during each iterative cycle 418. During each iterative cycle, when the first quality score 408A does not satisfy the image modulation condition 410, the additional filter parameter 426 of each of the one or more additional image filters 424 is adjusted jointly with the first filter parameter 406A of the first image filter 404A.

In some embodiments, filter selection is fixed during each iterative cycle. In some embodiments, the first image filter 404A and the one or more additional filters 424 have preset values. The process 402 iterates among the preset values of the first image filter 404A and the one or more additional filters 424. Alternatively, in some embodiments, in accordance with a determination that the first quality score 408A does not satisfy the image modulation condition 410, the first image filter 404A and/or the one or more additional filters 424 is scaled according to a predefined scale factor for a subsequent iteration cycle. Alternatively, in some embodiments, in accordance with a determination that the first quality score 408A does not satisfy the image modulation condition 410, the first image filter 404A and/or the one or more additional filters 424 are varied (e.g., increased or decreased) by a predefined setting step for a subsequent iteration cycle.

Conversely, in some embodiments, filter selection is not fixed, and is adjusted during each iterative cycle. For example, the electronic system selects an alternative image filter 434 having an alternative filter parameter 436. During each iterative cycle, when the first quality score 408A does not satisfy the image modulation condition, the electronic device determines whether to select the alternative image filter 434 and whether to adjust the alternative filter parameter 436 of the alternative image filter 436 jointly with the first filter parameter 406A of the first image filter 405A.

The first quality factor 408A is distinct from image contrast or image processing speed. Rather, the quality factor 408A depends on the image modulation process 400 that varies the first filter parameter 406A to form the two grayscale clusters 414A and 414B. The electronic system uses various means of image manipulation to create image areas 412' that better facilitate recognition of the barcode. Additionally, the image modulation process 400 is implemented for a respective image area of each individual barcode located within the same first image 402. For example, referring to FIG. 4B, a first image area 412A is associated with the first image filter 404A having the first filter parameter 406A corresponding to the first quality score 408A that satisfies the image modulation condition 410. A second image area 412B is associated with a second image filter 404B having a second filter parameter 406B corresponding to a second quality score 408B that satisfies the image modulation condition 410. The second image filter 404B having the second filter parameter 406B is determined independently of the first image filter 404A having the first filter parameter 406A. In some instances, the second image filter 406B is the same as the first image filter 404A, and the second filter parameter 406B is determined to be identical to the first filter parameter 406A. In some instances, the second image filter 404B is different from the first image filter 404A. In some instances, the second image filter 404B is the same as the first image filter 404A, and the second filter parameter 406B is different from the first filter parameter 406A. As such, image filtering is optimized separately for two different image areas corresponding to different barcodes in the same image.

Referring to FIG. 4A, in some embodiments, during each iterative cycle, the grayscale values of the processed image area 412 are grouped into the two grayscale clusters 414A and 414B, as illustrated in the graph 428. In some embodiments, a first spreading and a second spreading of grayscale values are determined for the two grayscale clusters 414A and 414B, and a grayscale difference of the two grayscale clusters is determined (e.g., as the difference between two average grayscale values of the clusters 414A and 414B). The first quality score 408A is determined based on the first spreading, the second spreading, and the grayscale difference of the two grayscale clusters. In some embodiments, the image modulation condition specifies that the first quality score 408A must be greater than a threshold quality value $Q_{TH}$. In some embodiments, the variation of the first quality score 408A must be less than a predefined quality variation within at least a predefined number of iterative cycles in order to satisfy the modulation condition 410.

In some embodiments, multiple image modulation processes 400 is implemented in parallel to process a plurality of images. For example, the first image 402 is extracted from memory of the electronic system and processed in a background image modulation process 400. A current image is recently captured by a camera of the electronic system, and the electronic system implements a foreground image modulation process 400 to process the current image concurrently with the background image modulation process 400.

Alternatively, in some embodiments, a plurality of first images 402 is captured using a plurality of image settings 430. Every two first images 402 have different values for at least one of the plurality of image settings 430. The plurality of image settings 430 includes a subset of: a barcode position in a respective image, a gain, a shutter speed of a camera, an aperture of a camera lens, and an ISO control for sensitivity of image sensors. In some embodiments, the at least one of the plurality of image settings is one of an exposure or gain of a sensor, a brightness level of lighting, a type of lighting (e.g., polarized or not polarized), a lighting angle, light color.

Further, in some embodiments, the plurality of first images 402 is successively processed until a first quality score 408A satisfies the image modulation condition 410. For each first image 402, an image area 412 is identified and processed to generate a plurality of grayscale values 416 of a processed image area 412'. The first quality score measures a quality of two grayscale clusters 414A and 414B formed to group the plurality of grayscale values 414 of the processed image area 412'. It is determined whether the first quality score satisfies the image modulation condition. In accordance with a determination that the first quality score does not satisfy the image modulation condition, at least one of the plurality of image settings 430 is adjusted to obtain a next first image 402. Optionally, the next first image 402 is captured based on adjustment of the at least one of the plurality of image settings 430. Optionally, the next first image 402 has already been captured and is selected for next iteration cycle based on the adjusted image setting. At least one of the plurality of image settings 430 is determined for processing additional barcode images is based on this iterative process corresponding to the first quality score that satisfies the image modulation condition.

In some embodiments, as the plurality of first images 402 having the image settings 430 are iteratively processed, a fixed first filter 404A and a fixed first filter parameter 406A are applied. Alternatively, in some embodiments, as each of the plurality of first images 402 having the image settings 430 is processed, the first filter parameter 406A of the first filter 404A is iteratively identified.

In some embodiments, the plurality of image settings has preset values. The process 402 iterates among the preset values of the plurality of image settings. Alternatively, in some embodiments, in accordance with a determination that the first quality score does not satisfy the image modulation condition, the at least one of the plurality of image settings 430 is scaled according to a predefined scale factor to obtain a next first image 402. Alternatively, in some embodiments, in accordance with a determination that the first quality score does not satisfy the image modulation condition, the at least one of the plurality of image settings 430 is varied (e.g., increased or decreased) by a predefined setting step to obtain a next first image 402.

Figure 5A:
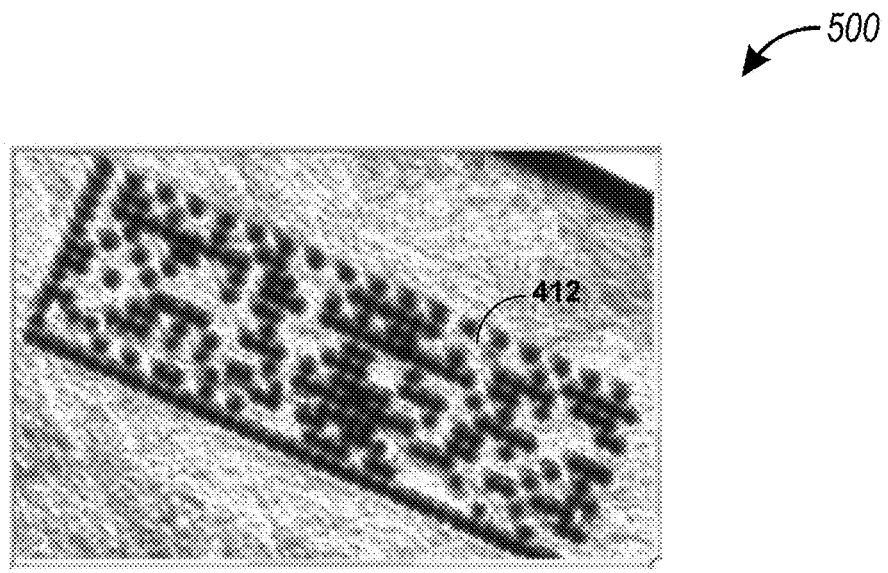
FIG. 5A is a region of interest (ROI) of a first image having an image area where a barcode is located, in accordance with some embodiments.
Figure 5B:
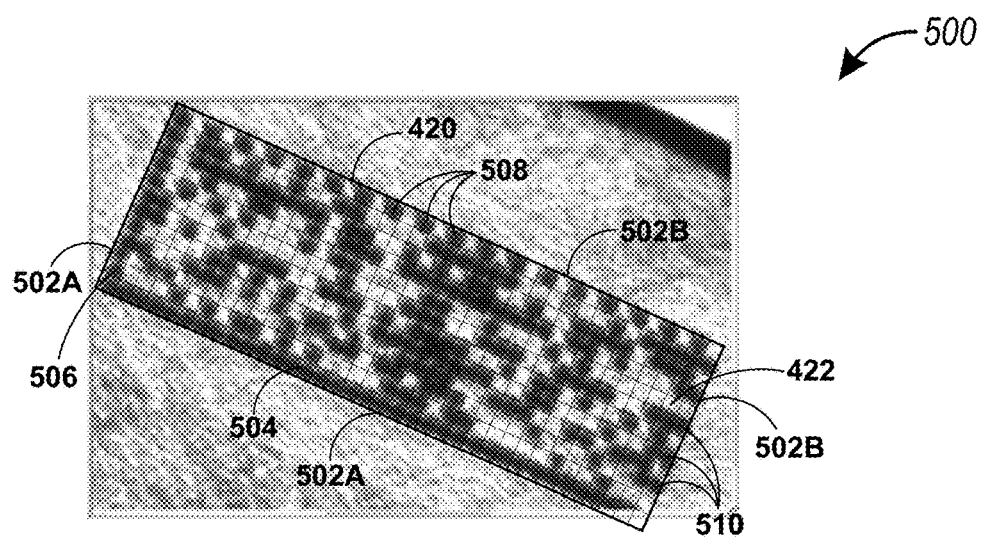
FIG. 5B is a ROI on which an image area of a barcode is divided based on a grid pattern, in accordance with some embodiments.
Figure 5C:
FIG. 5C is an image area of a barcode having a plurality of grid cells corresponding a plurality of grayscale values, in accordance with some embodiments.

FIG. 5A is a region of interest (ROI) 500 of a first image 402 having an image area 412 where a barcode is located, in accordance with some embodiments. FIG. 5B is an ROI 500 on which the image area 412 of a barcode is divided based on a grid pattern 420, in accordance with some embodiments. FIG. 5C is a processed image area 412' of a barcode having a plurality of grid cells 422 corresponding a plurality of grayscale values, in accordance with some embodiments. Referring to FIG. 5A, in some embodiments, the image area 412 closely encloses the barcode, and is rotated at an angle with respect to edges of the first image 402. The ROI 500 is identified to enclose the image area 412. The image modulation process 400 is implemented on the level of the ROI 500. In some embodiments not shown, the ROI 500 includes all pixels associated with the barcode enclosed in the image area 412. Edges of the ROI 500 do not overlap with any pixel of the barcode. Alternatively, in some embodiments not shown, the ROI 500 includes a subset of pixels associated with the barcode enclosed in the image area 412. An edge of the ROI 500 intersects with one or more edges of the barcode. For example, a corner of the barcode is not captured in the ROI 500. In some situations, the missing corner either does not include information encoded in the barcode or is supplemented by another image to provide missing information encoded in the barcode.

Referring to FIG. 5B, the image area 412 is divided into a plurality of grid cells 422 based on a grid pattern 420. Each of the plurality of grid cells 422 includes a plurality of image pixels and corresponds to a respective grayscale value. Respective grayscale values of the plurality of grid cells 422 form a plurality of grayscale values that are distributed on a plot 428 of grayscale values (see FIG. 4A). In some embodiments, one or more boundaries 502 (e.g., the boundaries 502A and 502B) of the image area 412 are identified in the image area 412. For example, the image area 412 has a row of connected dots 504 and a column of connected dots 506, which are perpendicular to each other, and two boundaries 502A are determined based on the row of connected dots 504 and the column of connected dots 506. Each barcode has a rectangular outline, and another two opposing boundaries 502B are determined based on the two boundaries 502A to form the rectangular outline defining the image area 412 closely enclosing the barcode. The grid pattern 420 is determined by connecting the one or more boundaries 502A and 502B. The image area 412 is enclosed by the one or more boundaries 502A and 502B and includes the plurality of grid cells 422 defined by the grid pattern 420. In some embodiments, the barcode has a shape distinct from the rectangular shape. In some embodiments, the one or more boundaries 502 includes one or more curves. In some embodiments, the one or more boundaries 502 form a polygon.

By these means, a 2D barcode is accurately located in the image area 412 of the ROI 500, and a sampling grid pattern 420 is accurately placed on the top of the 2D barcode. Each grid cell 422 is tightly enclosed among corresponding grid lines, and corresponds to a respective signal dot (also called bit) in the 2D barcode. Each light or dark grid cell 422 has a good separation from its neighboring grid cells 422.

In some embodiments, a plurality of grid markers 508 and 510 are identified in the image area 412. For example, the horizontal grid markers 508 define the horizontal pitch of grid cells in the grid pattern 420, and the vertical grid markers 510 define the vertical pitch of grid cells in the grid pattern 420. Grid lines are added based on positions of the grid markers 508 and 510 and pitches of the grid markers 508 and 510, thereby defining the plurality of grid cells 422 in the grid pattern 420. In some embodiments, only one set of grid markers 508 and 510 is applied to determine a uniform pitch for both horizontal and vertical directions. The plurality of grid lines are added based on positions and the uniform pitch of the grid markers, thereby defining the plurality of grid cells 422 in the grid pattern 420.

Referring to FIG. 5C, a single barcode has a plurality of combinations of filters and filter parameters that corresponds to quality scores 408. During the image modulation process 400, one or more combinations satisfying the image modulation condition 410 are identified. Each of the one or more combinations of filters and filter parameters is optionally selected to recognize the barcode in the processed image area 412' included in the ROI 500. Alternatively, in some embodiments, an average of the one or more combinations of filters and filter parameters is applied to recognize the barcode in additional images having the same or a different barcode. For each combination satisfying the image modulation condition 410, the plurality of grayscale values of the plurality of grid cells is aggregated to two grayscale clusters 414A and 414B (see FIG. 4A). A first quality score 408A measures the quality of the two grayscale clusters 414A and 414B. The image modulation process 400 (see FIG. 4A) is iteratively implemented until the first quality score 408A satisfies the image modulation condition 410.

Figure 6A:
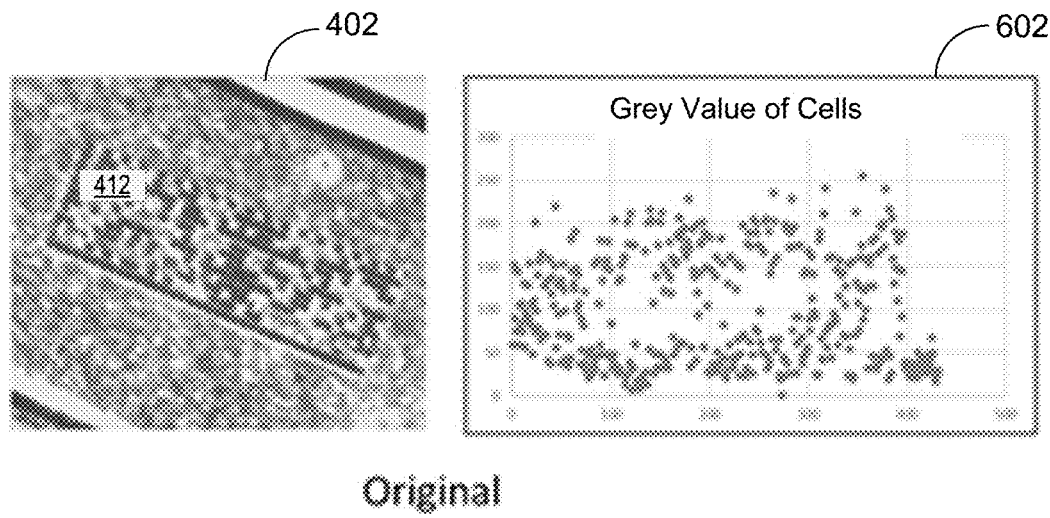
FIG. 6A shows an original image and a grayscale distribution of grayscale values of an image area, in accordance with some embodiments.
Figure 6B:
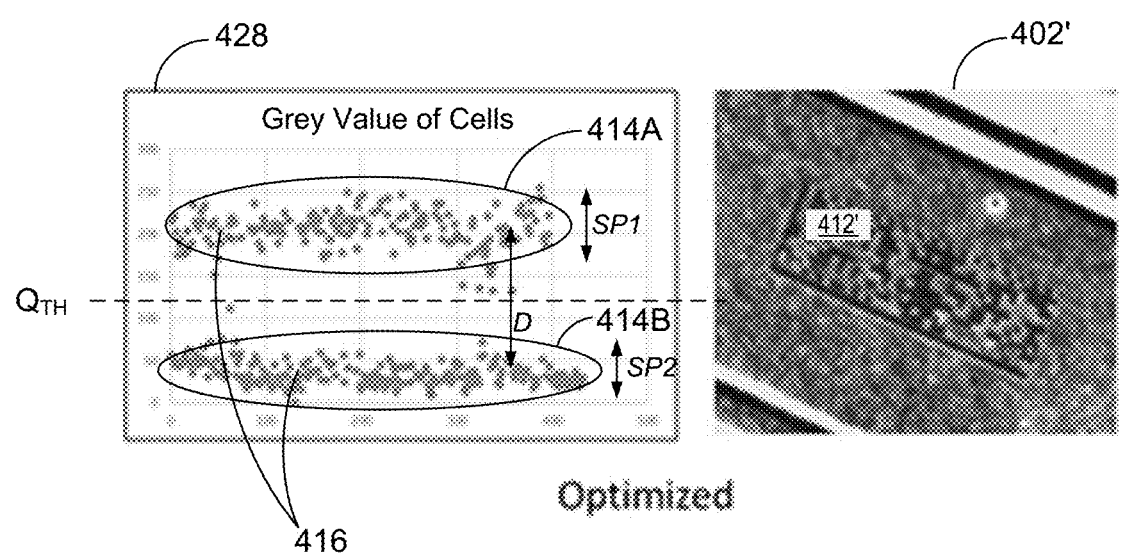
FIG. 6B shows a processed image and a grayscale distribution of grayscale values of a processed image area, in accordance with some embodiments.

FIG. 6A is an original image 402 and a grayscale distribution of grayscale values 602 of an image area 412, in accordance with some embodiments, and FIG. 6B is a processed image 402' and a grayscale distribution of grayscale values 416 of a processed image area 412', in accordance with some embodiments. The image area 412 of the original image 402 is processed to form the processed image are 412' of the processed image 402' after an image modulation process 400 is implemented. As at least a first filter parameter 406A of a first filter 404A is adjusted, a first quality score 408A is generated and satisfies an image modulation condition 410. The first quality score 408A measures the quality of two grayscale clusters 414A and 414B formed to group the plurality of grayscale values 416 of the processed image area 412', which is generated from the image area 412 using the first image filter 404A having the adjusted first filter parameter 406A. Referring to FIG. 6A, the grayscale distribution of grayscale values 602 of the image area 412 does not include two grayscale clusters 414A and 414B that are visually distinguishable. Conversely, referring to FIG. 6B, the grayscale values 416 of the processed image area 412' are aggregated into the two grayscale clusters 414A and 414B that are separated by a threshold quality value $Q_{TH}$.

In some embodiments, during each iterative cycle, the plurality of grayscale values of the processed image area 412 are grouped into the two grayscale clusters 414A and 414B. In some embodiments, a first spreading SP1 and a second spreading SP2 of grayscale values are determined for the two grayscale clusters 414A and 414B, respectively, and a grayscale difference D of the two grayscale clusters 414A and 414B is determined (e.g., as the difference between average grayscale values of the clusters 414A and 414B). The first quality score 408A is determined based on the first spreading SP1, the second spreading SP2, and the grayscale difference D of the two grayscale clusters. In some embodiments, the image modulation condition 410 specifies that the first quality score 408A must be greater than a threshold quality value $Q_{TH}$. In some embodiments, the variation of the first quality score 408A must be less than a predefined quality variation within at least a predefined number of iterative cycles in order to satisfy the image modulation condition 410.

In some embodiments, the first quality score 408A is the ratio of (1) the gray scale difference D and (2) a sum of the first spreading SP1 and the second spreading SP2. In some embodiments, the image modulation condition 410 requires that the first quality score 408A be greater than 3. In some embodiments, each of the first spreading SP1 and the second spreading SP2 excludes a subset of (e.g., 5%) outlier grayscale values in the grayscale clusters 414A and 414B. Alternatively, in some embodiments, the first quality score 408A is determined based on at least one of the contrast level of the image area 412' and the uniformity level of each grayscale cluster 414A or 414B. More details on determining the first quality score 408A are explained below with respect to FIGS. 9A-9D.

Referring to FIGS. 6A and 6B, the image area 412 of the first image 402 is a raw image. The grayscale values of the image area 412 do not have good grouping or separation. There is a middle area where grid cells 422 can be construed as either light or dark. Conversely, after the image modulation process 400 is implemented and imaging parameters are set up accordingly, the image quality of the processed image 402' is enhanced, and corresponding grayscale values are aggregated into two grayscale value clusters 414A and 414B having a higher quality score 408A. Information in the barcode is recognized more accurately, and the sampling grid pattern 420 is applied much more precisely. By these means, the image area 412' as modulated shows good modulation and high decodability.

Figure 7:
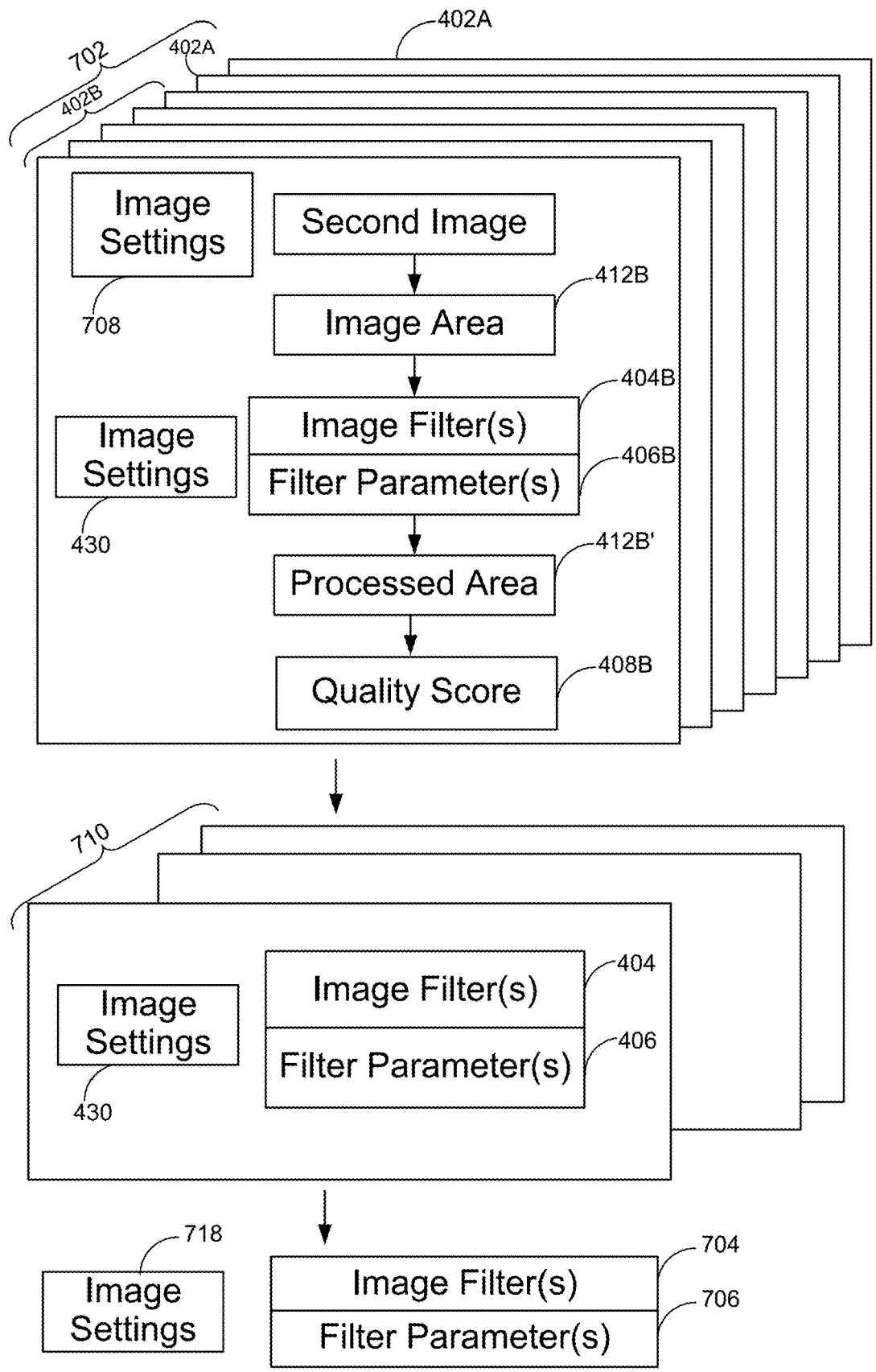
FIG. 7 is a flow diagram of an image modulation process for processing a plurality of images, including a first image, iteratively, in accordance with some embodiments.

FIG. 7 is a flow diagram of an image modulation process for processing a plurality of images 702 including a first image 402A iteratively, in accordance with some embodiments. The plurality of images 702 further includes one or more second images 402B of the barcode seen in the first image 402A. Each second image 402B includes a respective image area 412B enclosing the barcode, and each of the first and second images 402A and 402B corresponds to a plurality of image settings 430 for capturing the respective image 402A or 402B. Each respective second image 402B of the barcode is iteratively processed in a respective image modulation process until a respective second quality score 408B satisfies the image modulation condition 400 that the first quality score 408A of the first image 402A has satisfied. The set of filters 704 and the associated filter parameters 706 are determined for processing the additional barcode image based on image filters 404A and 404B and filter parameters 406A and 406B corresponding to quality scores 408A and 408B, of a first subset 710 of the first and second images 702, which satisfy the image modulation condition 410.

In some embodiments, for a second image 402B, during each iterative cycle, the respective image area 412 is processed using a second filter 404B with a second filter parameter 406B. The respective second quality score 408B is determined. It is further determined whether the respective second quality score 408B satisfies the image modulation condition 410. When the respective second quality score 408B does not satisfy the image modulation condition 410, the second filter parameter 406B of the second image filter 404B is adjusted for a subsequent iterative cycle. Further, in some embodiments, a plurality of grayscale values 416 of the processed image area 412B' of the respective second image 402B is determined, and aggregated into two grayscale value clusters 414A and 414B. The respective second quality score 408B measures the quality of the two grayscale clusters 414A and 414B formed to group the plurality of grayscale values 416 of the processed image area 412B' of the respective second image 402B.

In some embodiments, the first subset 710 of the first and second images 702 is identified based on their corresponding quality scores 408A and 408B (e.g., greater than that of any unselected image 702). Each of the first subset 710 of images has respective image settings 430 for capturing the respective image, and image filters 404 and filter parameters 406 for processing the respective image. For subsequent barcodes, a set of images is captured based on the image settings 430, the image filters 404, and the filter parameters 406 of each of the first subset 710 of the first and second images 702. As such, an optimal number of images is captured for additional barcodes and processed with their optimal image filters 404 and optimal filter parameters 406.

Alternatively, in some embodiments, the set of filters 704 and the associated filter parameters 706 are determined for processing each additional image. The set of image filters 704 includes image filters 406 applied in the first subset 710 of the first and second images 402A and 402B. Each included image filter is applied to process additional images, and has one or more respective filter values for a corresponding filter parameter 706 in a second subset of images. For each image filter in the set of image filters 704, an average filter parameter value is determined for the corresponding filter parameter 406 based on the respective filter values of the respective image filter 404 in the second subset of images. A single filter 704 is used in one or more images in the first subset 710 of the first and second images 402A and 402B, and the corresponding filter parameter 706 is an average of filter values of the one or more images in the first subset 710.

In some embodiments, the first subset 710 of images is selected from the first and second images 402A and 402B based on the first quality score 408A of the first image 402A and the respective second quality scores 408B of the one or more second images 402B. A set of image settings 718 is determined based on the selected first subset 710 of images for capturing the additional images. The set of filters 704 and the associated filter parameters 706 are determined for processing the additional images based on image filters and filter parameters of the first subset 710 of images. The plurality of image settings 430 or 718 includes a subset of: a barcode position in a respective image, a gain, a shutter speed of a camera, an aperture of a camera lens, and an ISO control for sensitivity of image sensors.

Figure 8:
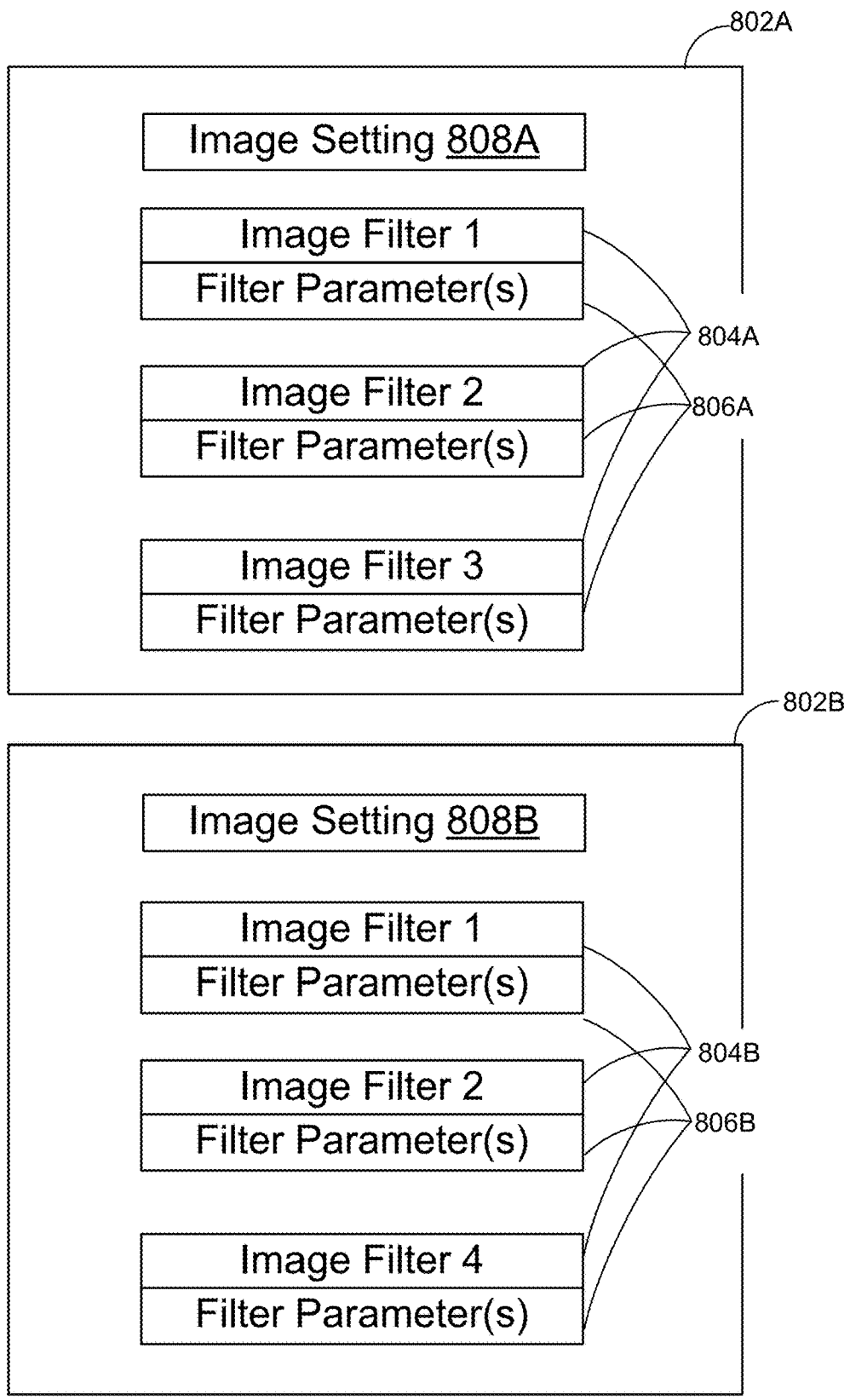
FIG. 8 are two example images, each of which is processed with a set of respective image filters and filter parameters, in accordance with some embodiments.

FIG. 8 provides two example images 802A and 802B, each of which is processed with a set of respective image filters 804A and 804B and filter parameters 806A and 806B, in accordance with some embodiments. The images 802A and 802B are captured with image settings 808A and 808B, respectively. When quality scores of the images 802A and 802B satisfy the image modulation condition 810, both of the images 802A and 802B are selected to determine conditions for capturing and/or processing additional images of the same barcode or different barcodes. In some embodiments, for a different barcode, a plurality of images is captured and processed to facilitate recognition of the different barcode. The plurality of images includes at least two images that are captured with image settings 808A and 808B and processed with corresponding image filters 804A having filter parameters 806A and image filters 804B having filter parameters 806B.

Alternatively, in some embodiments, a set of filters 704 and associated filter parameters 706 are determined for processing each additional barcode image. Both of the images 802A and 802B apply both of the image filters 1 and 2, but the first image applies image filter 3 whereas the second image applies image filter 4. In an example, the set of filters 704 includes all filters applied in the two images 802A and 802B (e.g., image filters 1, 2, 3, and 4). Each of the filter parameters 706 is a respective average of the filter parameters applied in one or more images using the filter parameter. In another example, the set of filters 704 includes only the shared filters applied in the two images 802A and 802B (e.g., image filters 1 and 2). Each of the filter parameters 706 is a respective average of the filter parameters applied in the two images 802A and 802B.

FIG. 9A is an example chart 900 plotting grayscale values 416 in a plurality of grid cells 422 of an image area 412', in accordance with some embodiments. FIG. 9B is an example chart 920 of a distribution of grayscale values 416 for a plurality of grid cells 422 of an image area 412', in accordance with some embodiments. FIGS. 9C and 9D are example charts 940 and 960 of a distribution of grayscale values 416 from which grayscale parameters are extracted, in accordance with some embodiments.

Referring to FIG. 9A, the grayscale values 416 in a plurality of grid cells 422 are plotted with reference to local thresholds 902. It is noted that the right end of the chart 900 has the smallest grayscale values, which correspond to the bottom part of an "L" pattern formed by connected dots 504 and 506 (FIG. 5B), and that the left end of the chart 900 has an evenly spaced pattern corresponding to the first pitch of the markers 508 and 510.

In some embodiments, a decoding method is applied. An electronic device measures a first absolute distance of a grayscale value of each grid cell 422 to the local threshold 902 and determines a first root mean square (RMS) value, which is in a range (e.g., 0-255) and normalized to 0-100%. The electronic system measures a second absolute distance of the grayscale value of each grid cell 422 to a pixel grayscale value range (e.g., equal to a sum of 1 and a difference of a maximum grayscale value and a minimum grayscale value in the image area 412'), and determines a second RMS value, which is in the pixel grayscale value range and normalized to 0-100%. The electronic system measures the first standard deviation of grayscale values 416 above the local threshold 902 and a second standard deviation of grayscale values 416 below the local threshold 902, and selects the greater standard deviation of the first and second standard deviations. The first absolute distance and the second absolute distance correspond to the contrast level of the image area 412'. The higher the contrast level of the image area 412', the better the quality score 408. The selected standard deviation of grayscale values 416 corresponds to the uniformity level of the two grayscale clusters 414A and 414B (e.g., dark and the light grid cells). The smaller the selected standard deviation, the better the quality score 408, and the less the noise in the image area 412'. Conversely, the larger the selected standard deviation, the more noise there is in the image area 412', and the worse the lighting condition.

In some embodiments, the grid pattern 420 includes pitches of markers 508 and 510 and four corners, and a global threshold quality value $Q_{TH}$ is applied. First absolute distances of grayscale values of a plurality of grid cells 422 are measured with respect to the global threshold quality value $Q_{TH}$, thereby determining the first RMS values, which is in a range (e.g., 0-255) and normalized to 0-100%. The electronic device measures second absolute distances of the grayscale values of the grid cells 422 to the pixel grayscale value range (e.g., which cuts off 5% of the tails of a histogram), and determines second RMS values, which is in the pixel grayscale value range and normalized to 0-100%. The second absolute distances are saturated at 100. The electronic device measures the first standard deviation of grayscale values 416 above the local threshold 902 and a second standard deviation of grayscale values 416 below the local threshold 902, and selects the larger standard deviation from the first and second standard deviations. The smaller the selected standard deviation, the better the quality score.

In some embodiments, the global threshold quality value $Q_{TH}$ is determined for the image area 412. Iterations are implemented over grayscale values less than the global threshold quality value $Q_{TH}$ to derive a dark distance saturation point 904 as a first distance to the global threshold quality value $Q_{TH}$. Iterations are implemented over grayscale values greater than and equal to the global threshold quality value $Q_{TH}$ to derive a light distance saturation point 906 as a second distance to the global threshold quality value $Q_{TH}$. Iterations are implemented over all grayscale values 416 of the plurality of grid cells 422 to determine RMS distances. Prior to squaring each distance, the RMS distances are saturated according to the dark and light distance saturation points 904 and 906. In some embodiments, a mean of mode values is applied. In some embodiments, a percentile of each grayscale value is applied in the mode. The grayscale values in the range of 70-90% are used to rank a mode. An RMS distance of each mode is determined and used as the saturation point for individuals for accumulating a total RMS value.

Referring to 9D, in some embodiments, a higher quality score 408H is obtained when differences of cell values from the threshold quality value $Q_{TH}$ are substantially consistent (e.g. the differences from $Q_{TH}$, associated with 80% of cell values, are located in a range of 20-30). Conversely, a lower quality score 408L is obtained when differences of cell values from the threshold quality value $Q_{TH}$ spreads out in a wider range (e.g. the differences from $Q_{TH}$, associated with 80% of cell values, are located in a range of 20-50).

It is noted that in some embodiments, a quality factor is also called a quality indicator, a quality metric, or a quality characteristic. In some embodiments, the quality factor includes an absolute numerical value. Alternatively, in some embodiments, the quality factor includes a non-numerical representation, e.g., a range, a grade, and a determination of quality.

Figure 10:
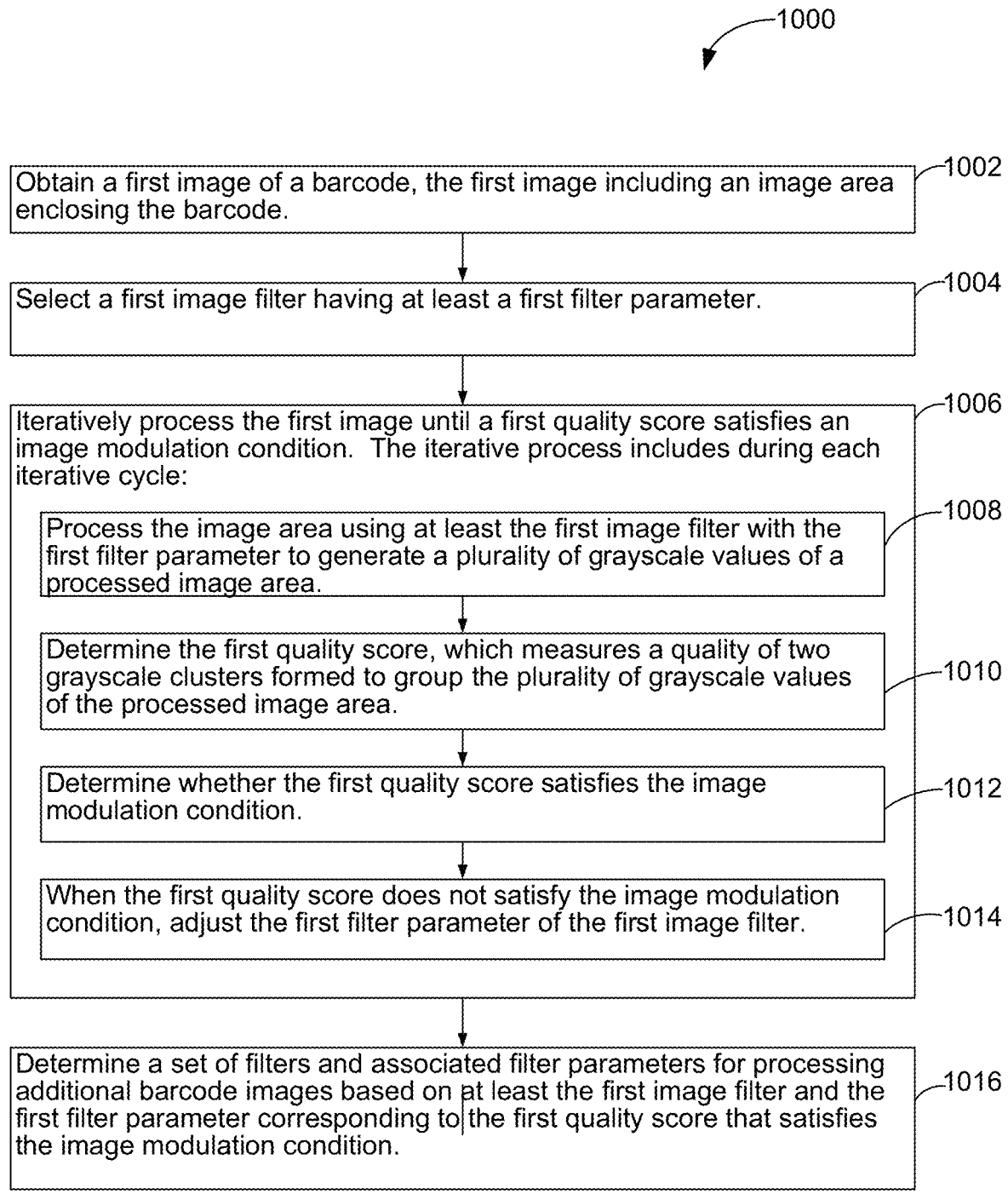
FIG. 10 is a flow diagram of a method for modulating image processing, in accordance with some embodiments.

FIG. 10 is a flow diagram of a method 1000 for modulating image processing, in accordance with some embodiments. The image modulation method 1000 is implemented by an electronic device 100 or by an image acquisition and processing module 240 of a device 100. In some embodiments, the electronic device includes one or more cameras 112 configured to capture images. In some embodiments, the electronic device is coupled to a camera or a distinct electronic device having a camera, and configured to acquire image data including a sequence of images.

The electronic device obtains (1002) a first image 402 (see FIG. 4) of a barcode, including an image area 412 enclosing the barcode, selects (1004) a first image filter 404A having at least a first filter parameter, and iteratively processes (1006) the first image 402 until a first quality score 408A satisfies an image modulation condition 410. During each iterative cycle 418, the electronic device (i) processes (1008) the image area 412 using at least the first image filter 404A with the first filter parameter to generate a plurality of grayscale values 416 of a processed image area 412, (ii) determines (1010) the first quality score 408A that measures the quality of two grayscale clusters 414A and 414B formed to group the plurality of grayscale values 416 of the processed image area 412, (iii) determines (1012) whether the first quality score 408A satisfies the image modulation condition 410, and (iv) when the first quality score 408A does not satisfy the image modulation condition 410, adjusts (1014) the first filter parameter of the first image filter 404A. The electronic device determines (1016) a set of filters (e.g., the filters 404 or 704 in FIG. 7) and associated filter parameters (e.g., the parameters 406 or 706 in FIG. 7) for processing the additional barcode images based on at least the first image filter 404A and the first filter parameter corresponding to the first quality score 408A that satisfies the image modulation condition 410.

In some embodiments, the electronic device divides the image area 412 into a plurality of grid cells 422 based on a grid pattern 420. Each of the plurality of grid cells 422 includes a plurality of image pixels and corresponds to a respective one of the plurality of grayscale values 416. Further, in some embodiments, the electronic device identifies one or more boundaries of the image area 412 and determines the grid pattern 420 connecting the one or more boundaries. The image area 412 is enclosed by the one or more boundaries and includes the plurality of grid cells 422 defined by the grid pattern 420. Additionally, in some embodiments, the electronic device determines the grid pattern 420 by identifying a plurality of grid markers in the image area 412 and adding a plurality of grid lines based on positions and a pitch of the plurality of grid markers, thereby defining the plurality of grid cells 422 in the grid pattern 420. Further, in some embodiments, the electronic device identifies in the first image 402 a region of interest (ROI) including the image area 412. The one or more boundaries are identified in the ROI. In some embodiments, the electronic device determines the respective grayscale value of each grid cell as an average of grayscale values of the plurality of image pixels.

In some embodiments, the electronic device generates the processed image area 412' by at least grouping the plurality of grayscale values 416 of the processed image area 412' into the two grayscale clusters 414A and 414B. Further, in some embodiments, the electronic device determines a first spreading and a second spreading of grayscale values of the two grayscale clusters 414A and 414B, and determines the grayscale difference of the two grayscale clusters 414A and 414B. The first quality score 408A is determined based on the first spreading, the second spreading, and the grayscale difference of the two grayscale clusters 414A and 414B. Additionally, in some embodiments, the first quality score 408A is further determined based on the contrast level of the image area 412 and/or the uniformity level of each grayscale cluster.

In some embodiments, the electronic device selects one or more additional image filters, each of which has at least one additional filter parameter. The first image filter 404A and the one or more additional filters are fixed during each iterative cycle 418. During each iterative cycle 418, when the first quality score 408A does not satisfy the image modulation condition 410, the electronic system adjusts the respective additional filter parameter of each of the one or more additional image filters jointly with the first filter parameter of the first image filter 404A.

In some embodiments, the electronic device selects an alternative image filter having an alternative filter parameter. During each iterative cycle 418, when the first quality score 408A does not satisfy the image modulation condition 410, the electronic system determines whether to select the alternative image filter or whether to adjust the alternative filter parameter of the alternative image filter jointly with the first filter parameter of the first image filter 404A.

In some embodiments, the electronic device obtains one or more second images of the barcode, and each second image includes a respective image area 412 enclosing the barcode. Each of the first and second images corresponds to a set of image settings for capturing the respective image. Each respective second image of the barcode is iteratively processed until a respective second quality score satisfies the image modulation condition 410. The set of filters and the associated filter parameters are determined for processing the additional barcode images based on image filters and filter parameters corresponding to quality scores, of a first subset of the first and second images, which satisfy the image modulation condition 410. Further, during each iterative cycle 418, the electronic system processes the respective image area 412 using a second filter with a second filter parameter, determines the respective second quality score, determines whether the respective second quality score satisfies the image modulation condition 410, and when the respective second quality score does not satisfy the image modulation condition 410, adjusts the second filter parameter of the second image filter.

Additionally, in some embodiments, during each iterative cycle 418, the electronic system generates a plurality of grayscale values 416 of a processed image area of the respective second image. The respective second quality score measures the quality of two grayscale clusters 414A and 414B formed to group the plurality of grayscale values 416 of the processed image area of the respective second image. In some embodiments, image filters applied in the first subset of the first and second images are included in the set of filters. Each included image filter is applied, and has respective filter values for a corresponding filter parameter, in a second subset of images. For each image filter in the set of image filters, the average filter parameter value for the corresponding filter parameter is determined based on the respective filter values of the respective image filter in the second subset of images.

In some embodiments, the electronic system selects the first subset of images from the first and second images based on the first quality score 408A of the first image 402 and the respective second quality scores of the one or more second images, and identifies a set of image settings based on the selected first subset of images for capturing the additional barcode images. The set of filters and the associated filter parameters are determined for processing the additional barcode image based on image filters and filter parameters of the first subset of images. In some embodiments, the plurality of image settings includes a subset of: a barcode position in a respective image, a gain, a shutter speed of a camera, an aperture of a camera lens, and an ISO control for sensitivity of image sensors.

In some embodiments, the first image filter 404A includes a subset of a group of morphology filters configured for implementing image operations consisting of: dilation, erosion, opening, closing, gradient, top hat, black hat, and hit-or-miss transform.

In some embodiments, the barcode is a two-dimensional (2D) matrix barcode or a one-dimensional (1D) linear barcode.

In some embodiments, the image modulation condition 410 specifies that the first quality score 408A must be greater than a threshold quality value or the variation of the first quality score 408A must be less than a predefined quality variation within at least a predefined number of iterative cycles.

An electronic device includes one or more processors and memory having instructions stored thereon. When the instructions are executed by the one or more processors, the device performs the image modulation method 1000.

A non-transitory computer-readable medium has instructions stored thereon, which, when executed by one or more processors of an electronic device cause the one or more processors to perform the image modulation method 1000.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various embodiments. In some embodiments, the memory 206 stores a subset of the modules and data structures identified above. Furthermore, the memory 206 may store additional modules or data structures not described above.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and "comprising," when used in this specification, specify the presence of stated features, steps, operations, elements, and/or components, but do not preclude the presence or addition of one or more other features, steps, operations, elements, components, and/or groups thereof.

As used herein, the phrase "based on" does not mean "based only on," unless expressly specified otherwise. In other words, the phrase "based on" describes both "based only on" and "based at least on."

As used herein, the term "exemplary" means "serving as an example, instance, or illustration," and does not necessarily indicate any preference or superiority of the example over any other configurations or embodiments.

As used herein, the term "and/or" encompasses any combination of listed elements. For example, "A, B, and/or C" entails all of these combinations: A only, B only, C only, A and B without C, A and C without B, B and C without A, or a combination of all three elements, A, B, and C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An image modulation method implemented at an electronic device, comprising:
   obtaining a first image of a barcode, the first image including an image area enclosing the barcode;

selecting a first image filter having at least a first filter parameter;
iteratively processing the first image until a first quality score satisfies an image modulation condition, including, during each iterative cycle:
processing the image area using at least the first image filter with the first filter parameter to generate a plurality of grayscale values of a processed image area;
determining the first quality score that measures a quality of two grayscale clusters formed to group the plurality of grayscale values of the processed image area;
determining whether the first quality score satisfies the image modulation condition; and
in accordance with a determination that the first quality score does not satisfy the image modulation condition, adjusting the first filter parameter of the first image filter; and
determining a set of additional image filters and associated filter parameters for processing additional barcode images based on at least the first image filter and the first filter parameter corresponding to the first quality score that satisfies the image modulation condition.

2. The method of claim 1, further comprising:
dividing the image area into a plurality of grid cells based on a grid pattern, wherein each of the plurality of grid cells includes a plurality of image pixels and corresponds to a respective one of the plurality of grayscale values.

3. The method of claim 2, further comprising:
identifying one or more boundaries of the image area; and
determining the grid pattern connecting the one or more boundaries, wherein the image area is enclosed by the one or more boundaries and includes the plurality of grid cells defined by the grid pattern.

4. The method of claim 3, wherein determining the grid pattern further comprises:
identifying a plurality of grid markers in the image area; and
adding a plurality of grid lines based on positions and pitch of the plurality of grid markers, thereby defining the plurality of grid cells in the grid pattern.

5. The method of claim 3, further comprising identifying in the first image a region of interest (ROI) including the image area, wherein the one or more boundaries are identified in the ROI.

6. The method of claim 2, further comprising:
determining the respective grayscale value of each grid cell as an average of grayscale values of the plurality of image pixels in the respective grid cell.

7. The method of claim 1, wherein generating the processed image area further comprises:
grouping the plurality of grayscale values of the processed image area into a first grayscale cluster and a second grayscale cluster.

8. The method of claim 7, further comprising:
determining a first spreading of grayscale values of the first grayscale cluster and a second spreading of grayscale values of the second grayscale cluster; and
determining a grayscale difference between the two grayscale clusters;
wherein the first quality score is determined based on the first spreading, the second spreading, and the grayscale difference of the two grayscale clusters.

9. The method of claim 7, wherein determining the first quality score further comprises:
determining a contrast level of the image area and/or a uniformity level of each grayscale cluster.

10. The method of claim 1, further comprising:
selecting one or more supplemental image filters, each of which has at least one respective supplemental filter parameter, wherein the first image filter and the one or more supplemental filters are fixed during each iterative cycle, and iteratively processing the first image further includes, during each iterative cycle:
in accordance with a determination that the first quality score does not satisfy the image modulation condition, adjusting the respective supplemental filter parameter of each of the one or more supplemental image filters jointly with the first filter parameter of the first image filter.

11. An electronic device, comprising:
one or more processors; and
memory storing one or more programs configured for execution by the one or more processors, the one or more programs comprising instructions for:
obtaining a first image of a barcode, the first image including an image area enclosing the barcode;
selecting a first image filter having at least a first filter parameter;
iteratively processing the first image until a first quality score satisfies an image modulation condition, including, during each iterative cycle:
processing the image area using at least the first image filter with the first filter parameter to generate a plurality of grayscale values of a processed image area;
determining the first quality score that measures a quality of two grayscale clusters formed to group the plurality of grayscale values of the processed image area;
determining whether the first quality score satisfies the image modulation condition; and
in accordance with a determination that the first quality score does not satisfy the image modulation condition, adjusting the first filter parameter of the first image filter; and
determining a set of additional image filters and associated filter parameters for processing additional barcode images based on at least the first image filter and the first filter parameter corresponding to the first quality score that satisfies the image modulation condition.

12. The electronic device of claim 11, wherein:
the one or more programs further comprise instructions for selecting an alternative image filter having an alternative filter parameter; and
iteratively processing the first image further includes, during each iterative cycle:
in accordance with a determination that the first quality score does not satisfy the image modulation condition, determining whether to select the alternative image filter or whether to adjust the alternative filter parameter of the alternative image filter jointly with the first filter parameter of the first image filter.

13. The electronic device of claim 11, wherein the one or more programs further comprise instructions for:
obtaining one or more second images of the barcode, each second image including a respective image area enclosing the barcode, each of the first and second images corresponding to a plurality of image settings for capturing the respective image; and
iteratively processing each respective second image of the barcode until a respective second quality score satisfies the image modulation condition;
wherein the set of additional image filters and the associated filter parameters are determined for processing the additional barcode images based on image filters and filter parameters corresponding to quality scores of a first subset of the first and second images, and the quality scores of the first subset of the first and second images satisfy the image modulation condition.

14. The electronic device of claim 13, wherein iteratively processing each respective second image of the barcode further comprises, during each iterative cycle:
   processing the respective image area using a second filter with a second filter parameter;
   determining the respective second quality score;
   determining whether the respective second quality score satisfies the image modulation condition; and
   in accordance with a determination that the respective second quality score does not satisfy the image modulation condition, adjusting the second filter parameter of the second image filter.

15. The electronic device of claim 13, wherein the one or more programs further comprise instructions for:
   selecting the first subset of images from the first and second images based on the first quality score of the first image and the respective second quality scores of the one or more second images;
   identifying a subset of the plurality of image settings based on the selected first subset of images for capturing the additional barcode images;
   wherein the set of additional image filters and the associated filter parameters are determined for processing the additional barcode image based on image filters and filter parameters of the first subset of images.

16. The electronic device of claim 13, wherein the plurality of image settings includes one or more of: a barcode position in a respective image, a gain, a shutter speed of a camera, an aperture of a camera lens, and a sensitivity of image sensors to light.

17. A non-transitory computer-readable storage medium storing one or more programs configured for execution by one or more processors of an electronic device, the one or more programs comprising instructions for:
   obtaining a first image of a barcode, the first image including an image area enclosing the barcode;
   selecting a first image filter having at least a first filter parameter;
   iteratively processing the first image until a first quality score satisfies an image modulation condition, including, during each iterative cycle:
   processing the image area using at least the first image filter with the first filter parameter to generate a plurality of grayscale values of a processed image area;
   determining the first quality score that measures a quality of two grayscale clusters formed to group the plurality of grayscale values of the processed image area;
   determining whether the first quality score satisfies the image modulation condition; and
   in accordance with a determination that the first quality score does not satisfy the image modulation condition, adjusting the first filter parameter of the first image filter; and
   determining a set of additional image filters and associated filter parameters for processing additional barcode images based on at least the first image filter and the first filter parameter corresponding to the first quality score that satisfies the image modulation condition.

18. The non-transitory computer-readable storage medium of claim 17, wherein the first image filter includes a set of morphology filters performing operations selected from the group consisting of: dilation, erosion, opening, closing, gradient, top hat, black hat, and hit-or-miss transform.

19. The non-transitory computer-readable storage medium of claim 17, wherein the barcode is a two-dimensional (2D) matrix barcode or a one-dimensional (1D) linear barcode.

20. The non-transitory computer-readable storage medium of claim 17, wherein the image modulation condition comprises:
   the first quality score being greater than a threshold quality value; or
   a variation of the first quality score being less than a predefined quality variation within at least a predefined number of iterative cycles.

* * * * *